United States Patent
de Vries

(10) Patent No.: US 12,357,988 B2
(45) Date of Patent: Jul. 15, 2025

(54) APPARATUS AND METHODS FOR BUBBLE TRAPS IN FLUIDIC DEVICES

(71) Applicant: Siemens Healthcare Diagnostics Inc., Tarrytown, NY (US)

(72) Inventor: Sape de Vries, Orleans (CA)

(73) Assignee: Siemens Healthcare Diagnostics Inc., Tarrytown, NY (US)

(*) Notice: Subject to any disclaimer, the term of this patent is extended or adjusted under 35 U.S.C. 154(b) by 911 days.

(21) Appl. No.: 17/593,305

(22) PCT Filed: Feb. 25, 2020

(86) PCT No.: PCT/US2020/019656
§ 371 (c)(1),
(2) Date: Sep. 15, 2021

(87) PCT Pub. No.: WO2020/190461
PCT Pub. Date: Sep. 24, 2020

(65) Prior Publication Data
US 2022/0203366 A1    Jun. 30, 2022

Related U.S. Application Data

(60) Provisional application No. 62/819,965, filed on Mar. 18, 2019, provisional application No. 62/863,546, filed on Jun. 19, 2019.

(51) Int. Cl.
*B01L 1/00* (2006.01)
*B01L 3/00* (2006.01)

(52) U.S. Cl.
CPC ..... *B01L 3/502723* (2013.01); *B01L 3/50273* (2013.01); *B01L 3/502738* (2013.01);
(Continued)

(58) Field of Classification Search
None
See application file for complete search history.

(56) References Cited

U.S. PATENT DOCUMENTS

2002/0022261 A1    2/2002    Anderson et al.
2004/0228764 A1    11/2004   Stephens et al.
(Continued)

FOREIGN PATENT DOCUMENTS

EP    1792655 B1    12/2008
JP    2004093558 A    3/2004
(Continued)

OTHER PUBLICATIONS

International Search Report and Written Opinion of International Application No. PCT/US2020/019656 dated May 15, 2020.

*Primary Examiner* — Jyoti Nagpaul

(57) ABSTRACT

Fluidic devices that include bubble traps are provided. A substrate for a fluidic device includes a first channel to carry a fluid; a chamber, coupled to the first channel, to receive the fluid from the first channel, the chamber having a top and a bottom; a second channel, coupled to the chamber, to receive the fluid from the chamber; and a plurality of barriers adjacent to the top of the chamber. The plurality of barriers inhibit bubbles in the fluid from entering the second channel. Methods for manufacturing and using fluidic devices that include bubble traps are also provided.

22 Claims, 13 Drawing Sheets

FIG. 9

(52) U.S. Cl.
CPC ............... *B01L 2200/0684* (2013.01); *B01L 2300/0663* (2013.01); *B01L 2300/0883* (2013.01); *B01L 2300/0887* (2013.01); *B01L 2400/06* (2013.01)

(56) References Cited

U.S. PATENT DOCUMENTS

| | | |
|---|---|---|
| 2005/0229696 A1 | 10/2005 | Takayama |
| 2007/0125434 A1 | 6/2007 | Nakao |
| 2007/0166195 A1 | 7/2007 | Padmanabhan et al. |
| 2009/0218704 A1 | 9/2009 | Murakami |
| 2015/0209783 A1 | 7/2015 | Ingber et al. |

FOREIGN PATENT DOCUMENTS

| | | | |
|---|---|---|---|
| JP | 2013-7592 A | | 1/2013 |
| JP | 2015166707 A | | 9/2015 |
| JP | 2016165704 A | | 9/2016 |
| JP | 2017523435 A | | 8/2017 |
| WO | WO2014039514 | * | 3/2014 |

* cited by examiner

APPARATUS AND METHODS FOR BUBBLE TRAPS IN FLUIDIC DEVICES

CROSS REFERENCE TO RELATED APPLICATIONS

This disclosure is a 371 of PCT/US2020/019656, filed Feb. 25, 2020, which claims benefit under 35 USC § 119(e) of U.S. Provisional Patent Applications Nos. 62/819,965, filed Mar. 18, 2019 and 62/863,546, filed Jun. 19, 2019. The entire contents of the above-referenced patent applications are hereby expressly incorporated herein by reference in their entireties for all purposes.

FIELD

This application relates generally to fluidic devices, and in particular to bubble traps for fluidic devices.

BACKGROUND

Fluidic devices are used to control and/or manipulate fluids for any of a variety of applications. A fluidic device could include channels that constrain the flow of a fluid in the device. If the dimensions of a channel are sufficiently small such that capillary forces dominate fluid flow, then the channel could be considered a microchannel. A channel could also or instead be considered a microchannel if at least one dimension of the channel (a radius, width or height, for example) is sub-millimeter, and/or if the channel carries sub-milliliter volumes of fluid. A fluidic device that includes a microchannel, and/or other microscale components, could be considered a microfluidic device.

Fluidic devices could incorporate and/or be coupled to one or more sensors to provide sensing capabilities. For example, a sample fluid could be pumped through channels in a fluidic device to a sensor, and the sensor could measure one or more properties of the fluid. A fluidic device that incorporates one or more sensors could be used as a diagnostic device. In the context of medical diagnostic devices, fluidic devices could be used to measure one or more properties of a bodily fluid. By way of example, a blood sample could be added to a fluidic device to measure the concentration of certain analytes in the blood. Improving the efficiency, reliability and repeatability of measurements is an important consideration in the design of diagnostic devices.

SUMMARY

According to an aspect of the present disclosure, there is provided a substrate for a fluidic device, the substrate including: a first channel to carry a fluid; a chamber, coupled to the first channel, to receive the fluid from the first channel, the chamber including a top and a bottom; a second channel, coupled to the chamber, to receive the fluid from the chamber; and a plurality of barriers adjacent to the top of the chamber to inhibit bubbles in the fluid from entering the second channel.

In some embodiments, the substrate is a unitary body.

In some embodiments, the second channel is coupled to the chamber at a position proximate the bottom of the chamber.

In some embodiments, the first channel is coupled to the chamber at a position proximate the bottom of the chamber.

In some embodiments, a cross-sectional area of the chamber is greater than a cross-sectional area of the first channel and a cross-sectional area of the second channel, where the cross-sectional areas of the chamber, first channel and second channel are measured perpendicular to a direction of flow for the fluid.

In some embodiments, the plurality of barriers includes an interior wall of the chamber.

In some embodiments, the plurality of barriers includes a transverse beam extending substantially perpendicular to a direction of flow for the fluid.

In some embodiments, the transverse beam is configured to trap at least one bubble between the top of the chamber and the transverse beam.

In some embodiments, an upstream surface of the beam is substantially perpendicular to the top of the chamber and a downstream surface of the beam is inclined relative to the top of the chamber.

In some embodiments, the plurality of barriers includes an interior wall of the chamber and a plurality of transverse beams extending substantially perpendicular to a direction of flow for the fluid.

In some embodiments, a height of the chamber is greater than a height of at least one barrier of the plurality of barriers, where the height of the chamber is measured as a distance from the top of the chamber to the bottom of the chamber, and the height of the at least one barrier is measured as a distance that the at least one barrier extends from the top of the chamber towards the bottom of the chamber.

In some embodiments, the height of the at least one barrier is at least one half of the height of the chamber.

According to another aspect of the present disclosure, there is provided a fluidic device including: a substrate as disclosed herein; a source of the fluid in fluid communication with the first channel, the source of the fluid being upstream of the first channel; and a bottom cover layer, coupled to a bottom surface of the substrate, to seal the bottom of the chamber.

In some embodiments, the fluidic device further includes a top cover layer, coupled to a top surface of the substrate, to seal the top of the chamber.

In some embodiments, the top cover layer and the bottom cover layer comprise an adhesive.

In some embodiments, the fluidic device further includes a sensor in fluid communication with the second channel, the sensor being downstream of the second channel.

According to yet another aspect of the present disclosure, there is provided a method of manufacturing a fluidic device, the method including: forming a substrate, the substrate including: a first channel to carry a fluid; a chamber, coupled to the first channel, to receive the fluid from the first channel, the chamber including a top and a bottom; a second channel, coupled to the chamber, to receive the fluid from the chamber; and a plurality of barriers adjacent to the top of the chamber to inhibit bubbles in the fluid from entering the second channel.

In some embodiments, forming the substrate includes molding the substrate.

In some embodiments, the method further includes applying a bottom cover layer to a bottom surface of the substrate to seal the bottom of the chamber.

In some embodiments, the method further comprises applying a top cover layer to a top surface of the substrate to seal the top of the chamber.

According to a further aspect of the present disclosure, there is provided a method of trapping bubbles entrained in a fluid in a fluidic device, the method including: pumping a fluid through a first channel in the fluidic device, through a chamber in the fluidic device that receives the fluid from the first channel, and into a second channel in the fluidic device that receives the fluid from the chamber, where a plurality of barriers adjacent to a top of the chamber inhibit bubbles in the fluid from entering the second channel.

In some embodiments, pumping the fluid through the first channel includes pumping the fluid through the first channel at a predetermined rate to induce a rate of flow for the fluid in the chamber that permits the bubbles to rise towards the top of the chamber and be trapped by the plurality of barriers.

Other aspects and features of embodiments of the present disclosure will become apparent to those ordinarily skilled in the art upon review of the following description.

BRIEF DESCRIPTION OF THE DRAWINGS

The foregoing summary, as well as the following detailed description of illustrative embodiments of the present application, will be better understood when read in conjunction with the appended drawings. For the purposes of illustrating the present application, there is shown in the drawings illustrative embodiments of the disclosure. It should be understood, however, that the application is not limited to the precise arrangements and instrumentalities shown. In the drawings.

DETAILED DESCRIPTION

Figure 1:
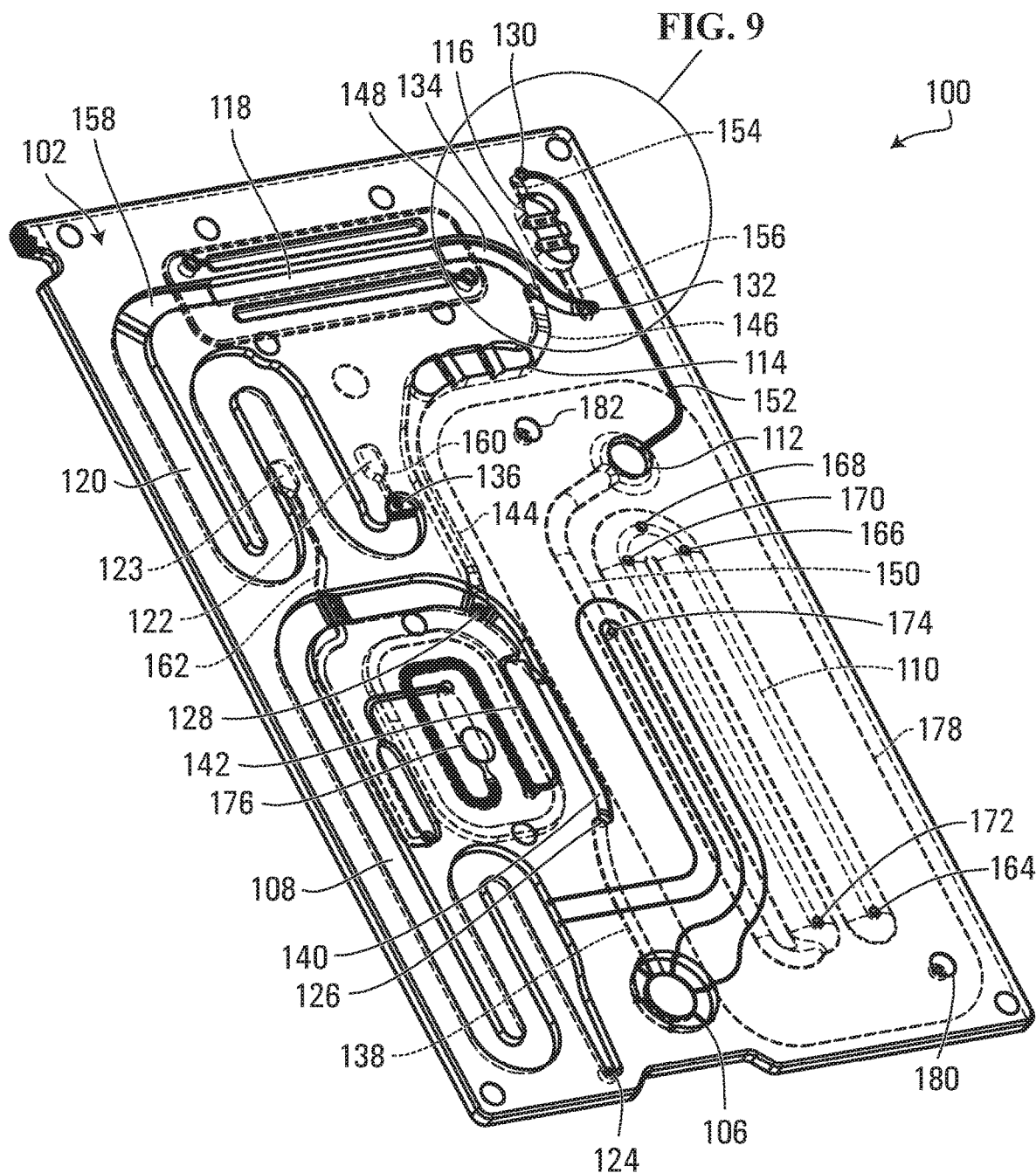
FIG. 1 is an isometric view of the top of an example substrate.

A fluid that is propagated and/or stored within a fluidic device could include entrained air bubbles. These air bubbles could be produced in any of a variety of ways. If the fluid is stored on the fluidic device, air bubbles could form when the fluidic device is agitated by shaking and/or dropping the fluidic device, for example. If the fluid is delivered to the fluidic device prior to use, then the fluid could be delivered to the fluidic device with entrained air bubbles present, or the method of delivery could produce entrained air bubbles. Bubbles could also or instead form as the fluid flows through the fluidic device. For example, air could mix with the fluid and form bubbles as the fluid flows through the fluidic device. Regardless of how they are produced, air bubbles could be undesirable in a fluidic device. For example, the air bubbles could clog or block channels in the fluidic device, hindering fluid flow. In the case that the fluidic device includes sensors, the air bubbles could also or instead become lodged over these sensors. The air bubbles could block the sensors and inhibit a fluid from coming into contact with at least a portion of the sensors. Thus, air bubbles could impede the proper response of sensors in a fluidic device. A need exists for a fluidic device with one or more structures to block and/or trap bubbles in a fluid. For example, air bubbles could be blocked and/or trapped before they reach a sensing region in a fluidic device.

The present disclosure relates, in part, to fluidic devices that include components or structures to inhibit the propagation of entrained bubbles. Some fluidic devices described herein include one or more barriers located within a fluid flow path to inhibit the propagation of air bubbles. By way of example, inhibiting the propagation of air bubbles could include slowing or at least temporarily stopping the movement of air bubbles relative to the movement of a fluid carrying the air bubbles. Barriers could also provide a form of bubble trapping. Bubble trapping includes holding air bubbles in a particular location. In general, bubble trapping is one way to inhibit the propagation of air bubbles.

In some embodiments, fluidic devices could be implemented in the form of a diagnostic consumable, such as a diagnostic card or test card for blood testing and/or analysis, for example. The fluidic devices could include a substrate with channels and/or other fluidic components formed therein. Cover layers could be applied to the substrate to seal the top and bottom surfaces of the substrate. The substrate could also include and/or be coupled to a sensing region that includes one or more sensors. These sensors could measure the concentration of certain analytes in a blood sample that is introduced into the sensing region. To perform measurements, the fluidic device could be inserted into an instrument such as a diagnostic card reader module. A blood sample could then be inserted into the fluidic device. The card reader module could then use and/or control the fluidic device to perform measurements on the blood sample. The combination of the fluidic device and the card reader module could be considered a blood analysis system. In some embodiments, these fluidic devices are microfluidic devices.

Figure 2:
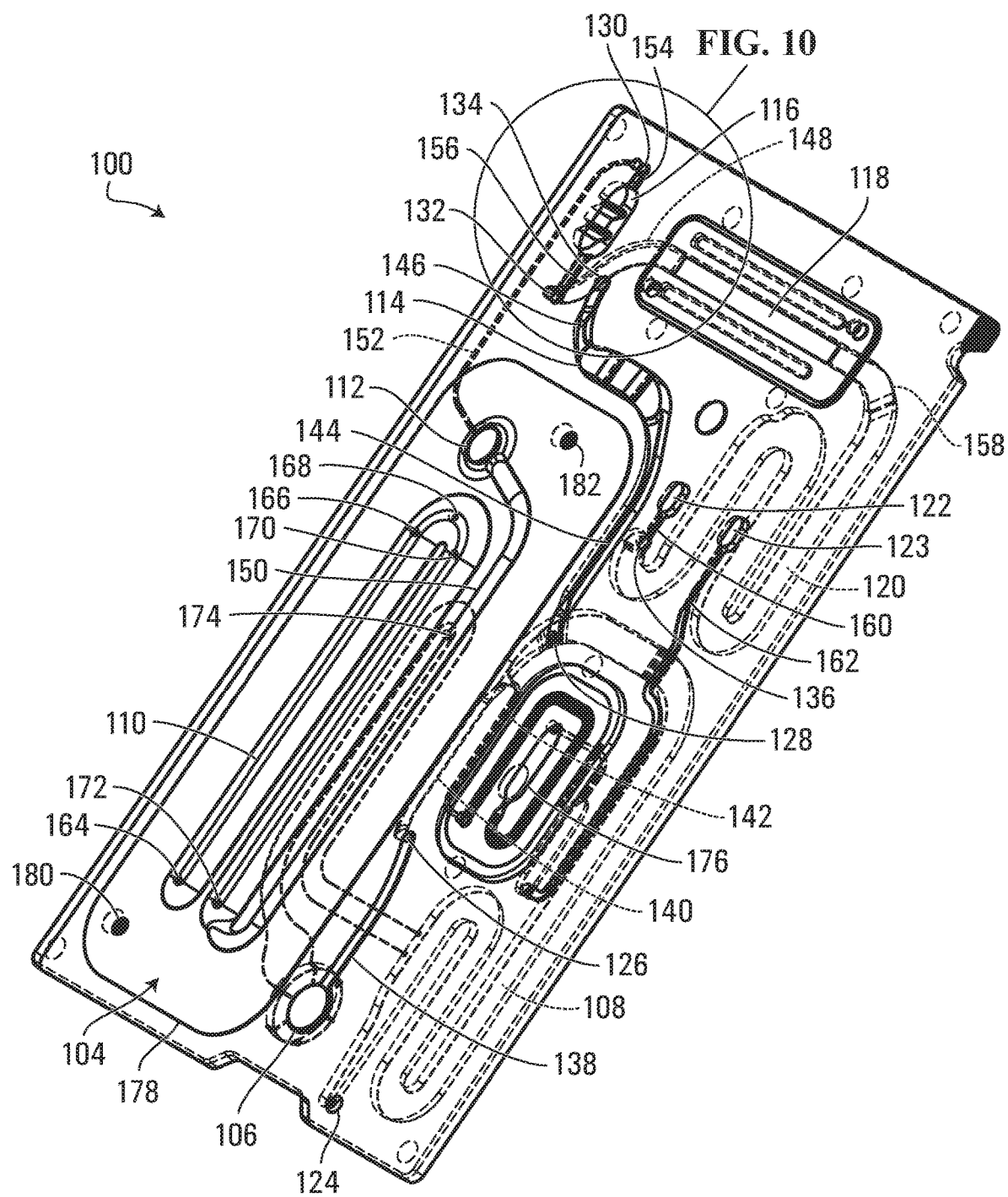
FIG. 2 is an isometric view of the bottom of the substrate of FIG. 1.
Figure 3:
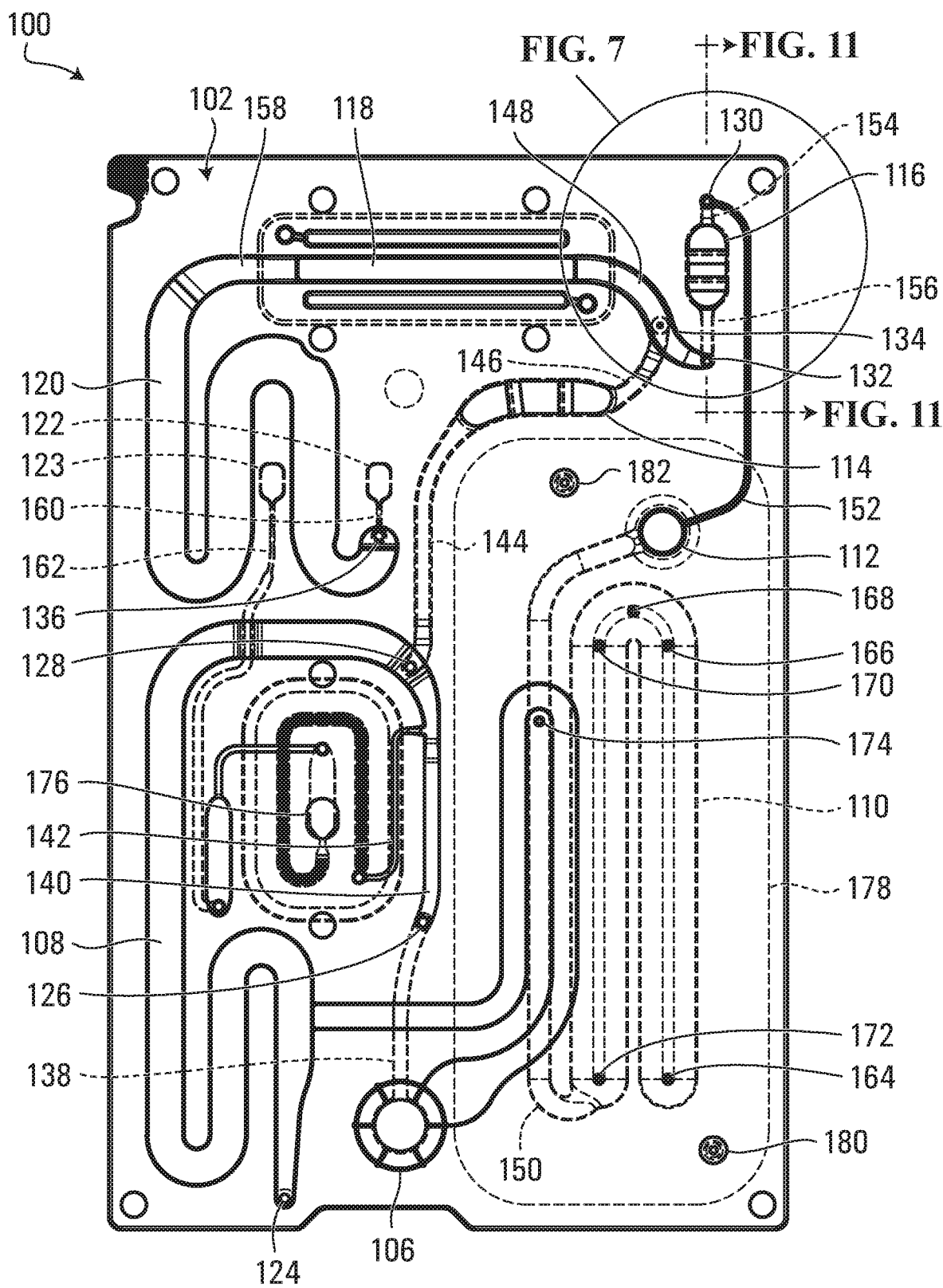
FIG. 3 is a plan view of the top of the substrate of FIG. 1.
Figure 4:
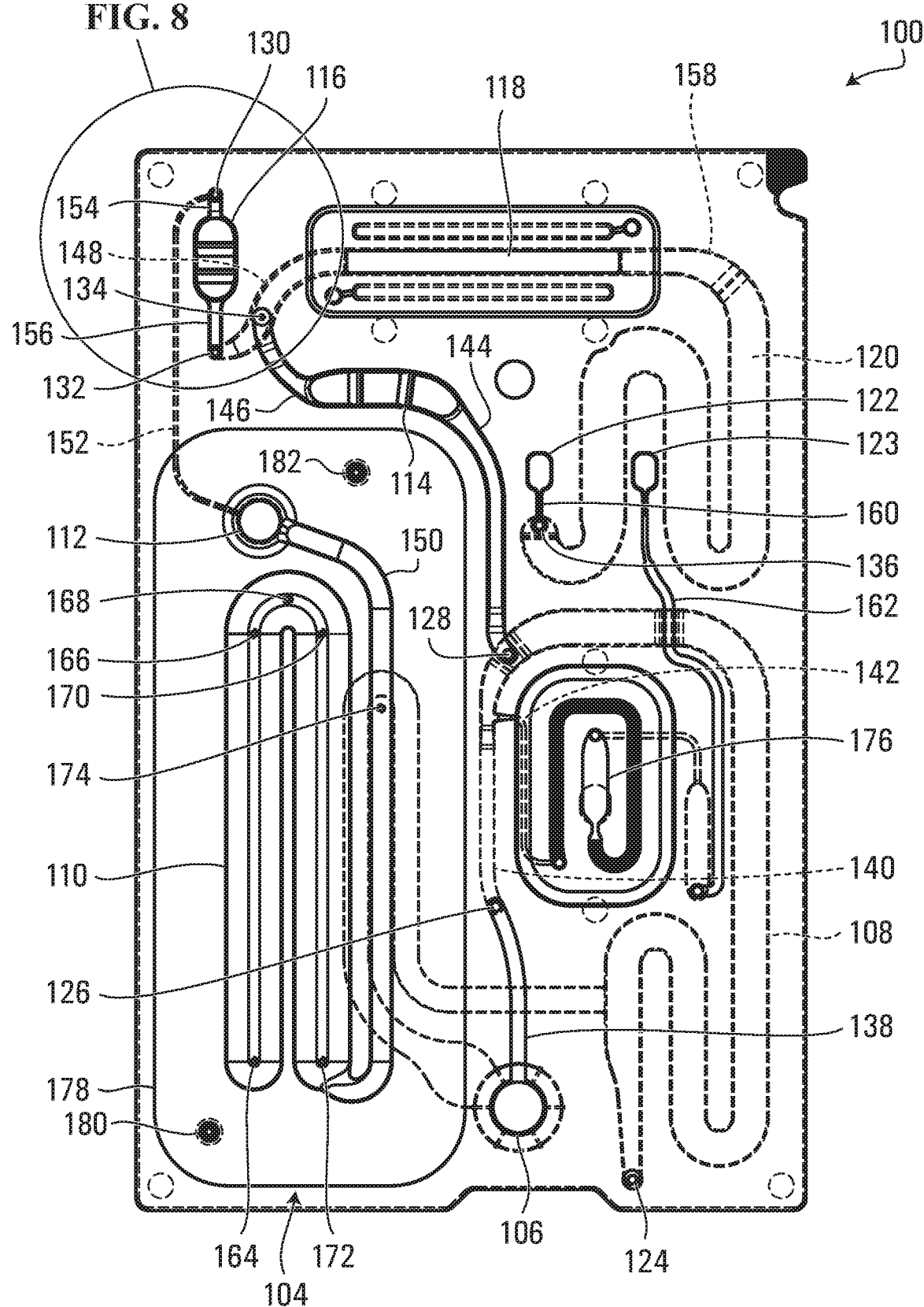
FIG. 4 is a plan view of the bottom of the substrate of FIG. 1.

FIGS. 1 to 4 illustrate an example substrate 100 for a fluidic device. FIGS. 1 and 2 are isometric views of the substrate 100, and FIGS. 3 and 4 are plan views of the substrate. FIGS. 1 and 3 are views of a top surface 102 of the substrate 100, and FIGS. 2 and 4 are views of a bottom surface 104 of the substrate. The terms "top" and "bottom" are used herein for ease of reference only, and do not require or imply a certain orientation of the substrate 100. Although the substrate 100 could be designed to be operated with the top surface 102 facing vertically upwards and the bottom surface 104 facing vertically downwards, this might not be the case in all implementations. Moreover, the orientation of the top surface 102 and the bottom surface 104 of the substrate 100 could have minimal or no impact on fabrication, storage and/or transportation of the substrate.

The substrate 100 is illustrated as being a rectangular prism that is approximately the size and shape of a credit card, but this is only an example. The substrate 100 could also or instead be other shapes such as triangular or circular, for example. The substrate could be made out of plastics, ceramics, glass and/or metal, for example. The substrate could be a single, unitary body or part. The dimensions of the substrate 100 are not limited to any specific ranges or values. The length and width of the substrate 100 could be considered to define the area of the top surface 102 and the bottom surface 104. In some implementations, the length and/or width of the substrate 100 is on the order of meters. In some implementations, the length and/or width of the substrate 100 is on the order of centimeters. In some implementations, the length and/or width of the substrate 100 is on the order of millimeters. Other lengths and/or widths of the substrate 100 are also possible. The thickness of the substrate 100 could be measured as the distance between the top surface 102 and the bottom surface 104 of the substrate. In some implementations, the thickness of the substrate 100 is on the order of centimeters. In some implementations, the thickness of the substrate 100 is on the order of millimeters. In some implementations, the thickness of the substrate 100 is on the order of micrometers. Other thicknesses of the substrate 100 are also possible. Although the top surface 102 and the bottom surface 104 of the substrate 100 are illustrated as being substantially flat, this might not be the case in all embodiments. For example, the top surface and/or the bottom surface of a substrate could also or instead be triangular, conical and/or hemispherical in shape. Accordingly, the thickness of a substrate could vary along its length and/or width. The substrate 100 is illustrated as being transparent, however substrates could also or instead be, in whole or in part, translucent or opaque.

The substrate 100 includes a sample fluid input port 106, a sample fluid reservoir 108, a calibration fluid reservoir 110, a valve hole 112, two bubble traps 114, 116, a sensing region 118, a waste fluid reservoir 120, multiple pump connection ports 122, 123, multiple vias 124, 126, 128, 130, 132, 134, 136, multiple channels 138, 140, 142, 144, 146, 148, 150, 152, 154, 156, 158, 160, 162, multiple vent holes 164, 166, 168, 170, 172, 174, 182, and a fill hole 180. The substrate 100 further includes an optical sensing region 176 and a calibration fluid pack region 178. In FIGS. 1 to 4, solid lines are used to illustrate components that are directly in view in each figure, and dashed lines are used to illustrate components that are hidden from view by at least a portion the substrate 100.

The channels 138, 140, 142, 144, 146, 148, 150, 152, 154, 156, 158, 160, 162 are provided to carry one or more fluids in the substrate 100. The channels 140, 142, 148, 152, 158 are trenches or grooves in the top surface 102 of the substrate 100. The channels 140, 142, 148, 152, 158 are illustrated as being open at the top surface 102 of the substrate 100 in FIGS. 1 and 3. Similarly, the channels 138, 144, 146, 150, 154, 156, 160, 162 are trenches or grooves in the bottom surface 104 of the substrate 100, which are open at the bottom surface of the substrate in FIGS. 2 and 4. The height of the channels 140, 142, 148, 152, 158 could be measured as the distance each channel extends from the top surface 102 into the thickness of the substrate 100, and the height of the channels 138, 144, 146, 150, 154, 156, 160, 162 could be measured as the distance each channel extends from the bottom surface 104 into the thickness of the substrate. The width of the channels 138, 140, 142, 144, 146, 148, 150, 152, 154, 156, 158, 160, 162 could be measured as the distance each channel extends in the direction parallel to the top surface 102 and/or bottom surface 104, and perpendicular to the direction of fluid flow in the channel. Any or all of the channels 138, 140, 142, 144, 146, 148, 150, 152, 154, 156, 158, 160, 162 could be microfluidic channels. For example, the width and/or height of any or all of the channels 138, 140, 142, 144, 146, 148, 150, 152, 154, 156, 158, 160, 162 could be on the order of micrometers. The width and/or height of any or all of the channels 138, 140, 142, 144, 146, 148, 150, 152, 154, 156, 158, 160, 162 could also or instead be on the order of millimeters or centimeters. The cross-sectional area of a channel or other fluidic component is generally measured as an area inside of the channel that is perpendicular to a direction of fluid flow. Although the channels 138, 140, 142, 144, 146, 148, 150, 152, 154, 156, 158, 160, 162 are illustrated with rectangular cross-sections in FIGS. 1 to 4, these channels could have other cross-sectional shapes as well, such as semicircular or triangular, for example.

The vias 124, 126, 128, 130, 132, 134, 136 are through-holes or bores that extend through the thickness of the substrate 100. Vias could be used to fluidly connect two or more components of the substrate 100. For example, via 126 fluidly connects channel 138 and channel 140, via 128 fluidly connects channel 140 and channel 144, via 130 fluidly connects channel 152 and channel 154, via 132 fluidly connects channel 148 and channel 156, via 134 fluidly connects channel 146 and channel 148, and via 136 fluidly connects channel 160 and the waste fluid reservoir 120. Vias could also or instead be used to fluidly connect a component of the substrate 100 to the top surface 102 and/or bottom surface 104 of the substrate. For example, the via 124 fluidly connects the sample fluid reservoir 108 to the bottom surface 104 of the substrate 100. Although illustrated as circular holes, the vias 124, 126, 128, 130, 132, 134, 136 could also or instead be other shapes such as rectangular or triangular, for example. The diameter of the vias 124, 126, 128, 130, 132, 134, 136 could be similar to the width of one or more of the components that each via connects. For example, the diameter of the via 126 could be similar to the width of the channel 138 and/or the channel 140. However, the diameter of the vias 124, 126, 128, 130, 132, 134, 136 could be different from the width of the components that each via connects.

The sample fluid input port 106 is provided to deliver a sample fluid to the substrate 100. In this sense, the sample fluid input port 106 could be considered to be a source of sample fluid for the substrate 100. The sample fluid could be any fluid that is measured and/or tested using the substrate 100. In some cases, the sample fluid is a blood sample. The sample input port 106 is a conical or cylindrical opening in the top surface 102 of the substrate 100. The sample input port 106 is coupled to the channel 138. The sample input port 106 could be sized and shaped to couple to a gasket (not shown) that is sized and shaped to engage with an end of a sample delivery device, such as a syringe or capillary tube (not shown), that delivers the sample fluid. For example, in the case of a syringe, this engagement between the sample input port 106 and the syringe could form a seal such that, when the sample fluid is propelled or pumped out of the syringe, the sample fluid is forced into the channel 138 and does not spill out of the sample input port.

The sample fluid reservoir 108 could be a relatively wide and long channel or chamber that is coupled to the channel 140. The sample fluid reservoir 108 is illustrated with a rectangular cross-section, however other cross-sectional shapes are also possible. The sample fluid reservoir 108 could be provided to store a sample fluid after it is delivered into the substrate 100. The via 124 could act as an air vent to allow air to escape the sample fluid reservoir 108 when it is displaced by the addition of sample fluid. During operation, the sample fluid might stay in the sample fluid reservoir 108 for an amount of time that is on the order of milliseconds, seconds, or minutes, for example.

The calibration fluid reservoir 110 could be a relatively wide and long channel or chamber that is coupled to the channel 150. The calibration fluid reservoir 110 is illustrated as a U-shaped channel with a semicircular cross-section, however other geometries are also possible. The calibration fluid reservoir 110 could be provided to store a calibration fluid and/or a calibration fluid pack that seals the calibration fluid. The calibration fluid pack could be positioned in a shallow depression provided by the calibration fluid pack region 178. The calibration fluid could be used to calibrate one or more sensors included on and/or coupled to the substrate 100. Calibration fluids could include fluids with known concentrations of one or more analytes. These analytes could correspond to analytes in the sample fluid that might be measured using the substrate 100. The vent holes 164, 166, 168, 170, 172, 174 are vias or bores that are provided to allow air to escape the calibration fluid reservoir 110 during fabrication of the calibration fluid pack. The vent holes 164, 166, 168, 170, 172 couple the calibration fluid reservoir 110 to the top surface 102 of the substrate 100, and the hole 174 couples the channel 150 to the top surface. The fill hole 180 and the vent hole 182 are vias or bores that are used to fill the calibration fluid reservoir 110 with calibration fluid. The fill and vent holes 180, 182 couple the calibration fluid pack region to the top surface 102 of the substrate 100.

The valve hole 112 could be a via or bore that extends through the thickness of the substrate 100. The channel 150 and the channel 152 could be fluidly connected by the valve hole 112. The valve hole 112 could be sized and shaped to accommodate and/or couple to a valve (not shown). This valve could control the flow of calibration fluid from the channel 150 to the channel 152. When the valve is closed, the flow of fluid between the channel 150 and the channel 152 could be blocked. When the valve is opened, the flow of fluid between the channel 150 and the channel 152 could be permitted. In some implementations, the valve could be closed until a seal in the valve is ruptured, allowing calibration fluid to flow into the channel 152.

The two bubble traps 114, 116 are provided to inhibit the movement of bubbles in the substrate 100. Each bubble that enters either of the bubble traps 114, 116 could be prevented from moving further downstream by one or more barriers in the bubble trap. Thus, the fluid that leaves the bubble traps 114, 116 could be free of air bubbles. The bubble trap 114 fluidly connects the channels 144, 146. When a fluid flows from the channel 144 and into the bubble trap 114, any or all bubbles in the fluid could be blocked and/or trapped in the bubble trap, and therefore prevented from entering the channel 146. Similar comments apply to the bubble trap 116, which fluidly connects the channels 154, 156. The operation and structure of bubble traps are discussed in further detail below with reference to FIGS. 7 to 15.

The sensing region 118 includes a channel that is coupled to the channel 148 and to the channel 158. The sensing region 118 extends through the thickness of the substrate 100, and is therefore illustrated as being open at the top surface 102 and bottom surface 104 of the substrate in FIGS. 1 to 4. The sensing region 118 could include and/or be coupled to one or more sensors that measure properties of fluids in the sensing region. For example, the sensors could measure the concentration of one or more analytes in a fluid that flows from the channel 148 to the channel 158. The sensing region 118 could also or instead be referred to as an assay region.

The waste fluid reservoir 120 is fluidly coupled to the channel 158, and stores fluid that has flowed through the sensing region 118. The waste fluid reservoir 120 is illustrated in FIGS. 1 to 4 as a meandering channel with a rectangular cross-section, however other geometries of the waste fluid reservoir are also possible.

The pump connection ports 122, 123 provide a connection to one or more external pumping systems. For example, these pumping systems could be provided in a diagnostic card reader module. The channel 160 is fluidly connected to the pump connection port 122, and the channel 162 is fluidly connected to the pump connection port 123. The pumping systems could include channels or tubes that fluidly connect to the pump connection ports 122, 123. In some embodiments, the pumping systems could include vacuum pumping systems that pull fluid in one or more channels of the substrate 100 towards the pump connection ports 122, 123.

The optical sensing or assay region 176 could provide additional sensing functionality to a fluidic device incorporating the substrate 100. The channel 142 fluidly connects the channel 140 to the optical sensing region 176, and the channel 162 fluidly connects the optical sensing region to the pump connection port 123. In operation, at least a portion of a blood sample could be directed through the channel 142 and be measured in the optical sensing region 176. In some embodiments, light absorbance measurements could be performed in the optical sensing region 176 to measure the concentrations of total hemoglobin (tHb), oxyhemoglobin (O2HB), carboxyhemoglobin methemoglobin (MetHb), deoxyhemoglobin (HHb), oxygen saturation (SO2) and/or total bilirubin (tBili) in the blood sample, for example.

Figure 5:
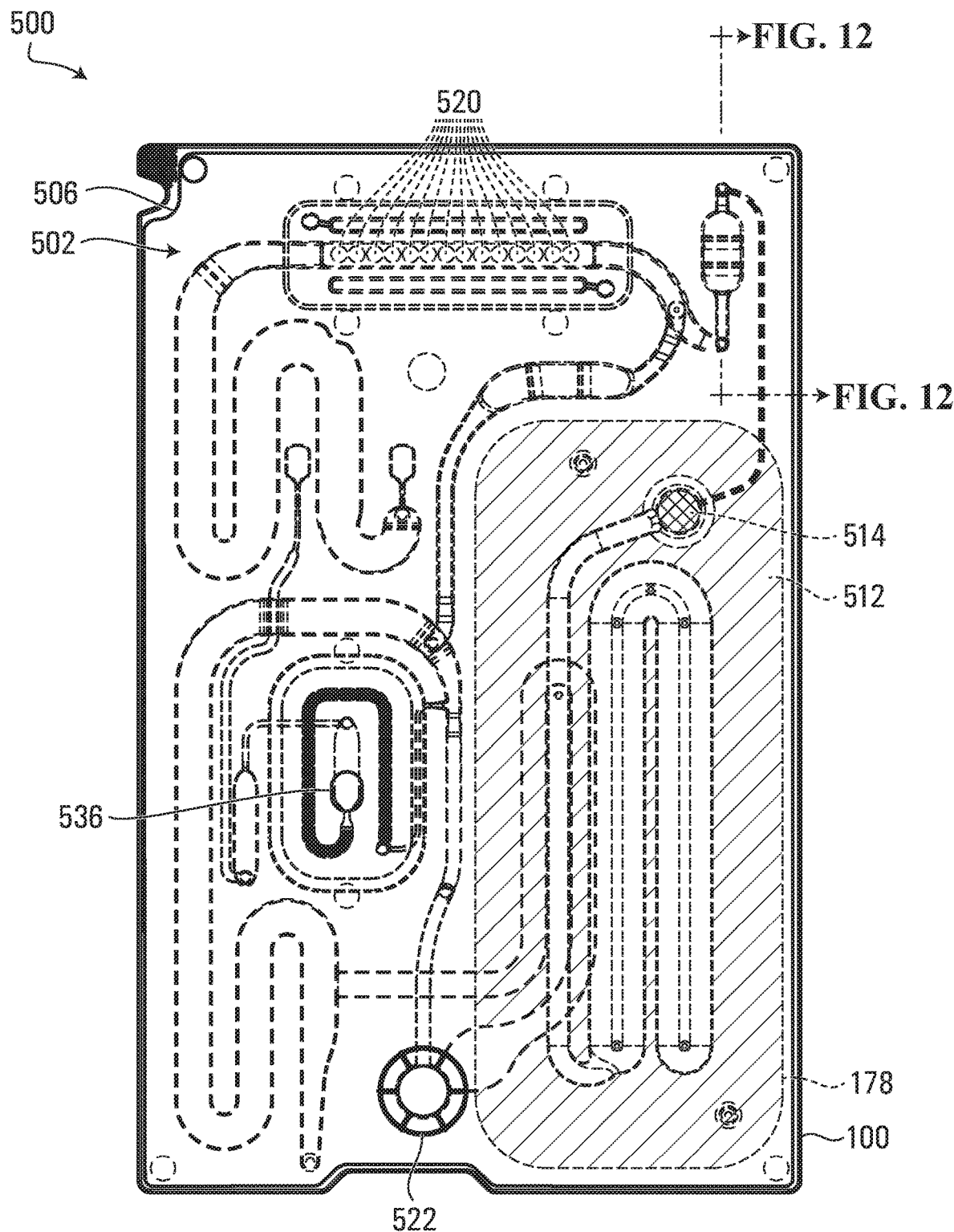
FIG. 5 is a plan view of the top of an example fluidic device incorporating the substrate of FIG. 1.
Figure 6:
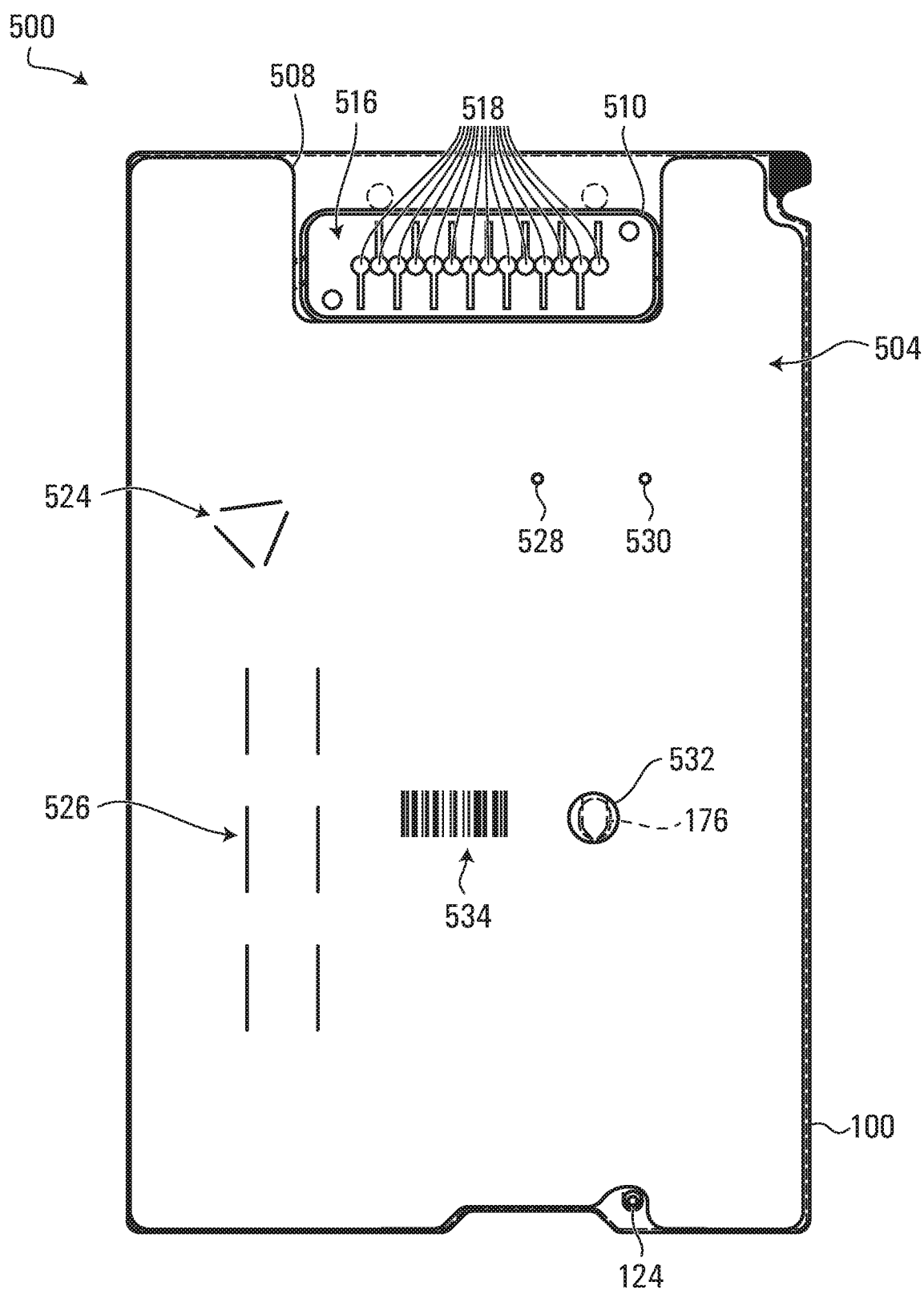
FIG. 6 is a plan view of the bottom of the fluidic device of FIG. 5.

The substrate 100 could be used in a fluidic device and/or a diagnostic device. FIGS. 5 and 6 illustrate plan views of an example fluidic device 500 that incorporates the substrate 100. The fluidic device 500 could be considered an assembled diagnostic card or test card for blood analysis and/or testing. In some implementations, the fluidic device 500 is a microfluidic device. The fluidic device 500 could be configured, by being sized and shaped for example, to be received by a diagnostic card reader module (not shown). FIG. 5 is a view of the top surface 502 of the fluidic device 500, and FIG. 6 is a view of the bottom surface 504 of the fluidic device. In addition to the substrate 100, the device 500 includes a top cover layer 506, a bottom cover layer 508, a sensor array 510, a calibration fluid pack 512 (illustrated using parallel hatching) and a valve 514 (illustrated using cross-hatching). Many components of the substrate 100 are not labelled in FIGS. 5 and 6 for the purpose of clarity.

At least a portion of the top surface 102 and bottom surface 104 of the substrate 100 are sealed using the top cover layer 506 and the bottom cover layer 508, respectively. The top and bottom cover layers 506, 508 could be impermeable to liquids (and possibly gases) to provide a liquid tight (and possibly gas tight) seal. In some implementations, the top and bottom cover layers 506, 508 could include plastic, metal and/or ceramic films that are bonded to the substrate 100 using an adhesive. For example, in some implementations, the top cover layer 506 and/or the bottom cover layer 508 could be implemented as an adhesive label or sticker. Non-limiting examples of adhesives include acrylic adhesives and silica adhesives. The top and bottom cover layers 506, 508 could form a seal around one or more components of the substrate 100. For example, the top cover layer 506 could seal, at least in part, the sample fluid reservoir 108, the bubble traps 114, 116, the sensing region 118, the waste fluid reservoir 120 and the channels 140, 142, 148, 152, 158. The bottom cover layer 508 could seal, at least in part, the sample input port 106, the calibration fluid reservoir 110, the bubble traps 114, 116 and the channels 138, 144, 146, 150, 154, 156, 160, 162. Furthermore, the top and bottom cover layers 506, 508 could seal, at least in part, the vias 124, 126, 128, 130, 132, 134, 136. The top cover layer 506 is illustrated as being substantially transparent and the bottom cover layer 508 is illustrated as being substantially opaque, but this is only an example. In general, either or both of the top cover layer 506 and the bottom cover layer 508 could be transparent, translucent, opaque, or a combination thereof. In FIG. 5, dashed lines are used to illustrate components that are hidden from view by the top cover layer 506.

The sensor array 510, which could also be referred to as an electrode module, is bonded to the bottom surface 104 of the substrate 100. The sensor array 510 overlaps and seals at least a portion of the sensing region 118. The bottom cover layer 508 does not overlap the sensor array 510. The sensor array 510 could be fabricated using smart-card chip-module technology. The sensor array 510 includes a gold coated copper metal foil laminated to an epoxy foil element 516 with an optional adhesive. The metal foil is formed into an array of electrode elements 518. Each electrode element 518 could have a connection end for forming an electrical connection to a measuring circuit in a card reader module, for example. The connection ends of the electrode elements 518 are not labelled for reasons of clarity. The metal foil could also include heater contacts (not shown), which are electrically isolated from the electrode elements 518, to physically contact a heater in a card reader module. The epoxy foil element 516 has through-holes at the position of each of the electrode elements 518. Multiple sensors 520 are coupled to the electrode elements 518 through these through-holes in the epoxy foil element 516. Each of the sensors 520 are positioned over the sensing region 118 of the substrate 100. In use, the sensors 520 could be used to measure one or more properties of a calibration fluid and/or sample fluid in the sensing region 118. The sensors 520 could be electrochemical sensors that are used for measuring concentrations of gases, electrolytes and/or metabolites. The sensors 520 could include potentiometric sensors to measure sodium, potassium, ionized calcium, chloride, urea, $TCO_2$, pH levels and/or $CO_2$ partial pressure; amperometric sensors to measure $O_2$ partial pressure, glucose, creatinine, and/or lactate; and/or conductometric sensors to measure hematocrit, for example. The number and geometry of the electrodes 518 and the sensors 520 is provided by way of example only. The same module fabrication technology can be used to make sensor arrays with many different electrode/sensor numbers and geometries.

The calibration fluid pack 512 could be considered a source of calibration fluid for the fluidic device 500. The calibration fluid pack 512 is sandwiched between the calibration fluid pack region 178 of the substrate 100 and the bottom cover layer 508. The calibration fluid pack 512 could fill the calibration fluid reservoir 110 and the channel 150. The calibration fluid pack 512 could be provided to seal and store a calibration fluid, in order to improve the stability of the calibration fluid over time. For example, the calibration fluid pack 512 could inhibit gases, such as carbon dioxide, from permeating into and/or out of the calibration fluid. In some implementations, the calibration fluid pack 512 could be formed from two metal foil elements that seal the calibration fluid. The first metal foil element could include a pressure sensitive adhesive on one side of the metal and a polyethylene coating on the other. During assembly, the first metal foil element could be die cut from a sheet and placed with adhesive side down onto the calibration fluid pack region 178 of the substrate 100. As illustrated in FIG. 5, the first metal foil element could extend over the calibration fluid reservoir 110, the channel 150 and the valve hole 112. When high air pressure is applied to the first metal foil element it could conform to the contour of the bottom surface 104 of the substrate 100. This metal foil deforming procedure could be similar to a blow-molding process, for example. A hydroforming process could also or instead be used. The vent holes 164, 166, 168, 170, 172, 174 allow air to escape the calibration fluid reservoir 110 during the metal foil deforming procedure.

Following the molding of the first metal foil element, the first metal foil element could be pierced through the fill and vent holes 180, 182 in the substrate 100, which are later used to fill the calibration fluid pack 512.

A rupture plug could be placed on the polyethylene coated side of the first metal foil element in a depression formed by the valve hole 112. The rupture plug could be a rigid disc, made of plastic for example, that is approximately the same thickness as the substrate 100. The rupture plug is slightly smaller in diameter than the valve hole 112, rendering the rupture plug capable of axial movement therein. The combination of the rupture plug and the first metal foil element could be considered to form the valve 514.

To seal the calibration fluid pack 512, a second polyethylene coated metal foil element could be laminated over the first metal foil element, where the polyethylene coating of the second metal foil element is facing the polyethylene coating of first metal foil element. A heat seal could be formed between the two metal foil elements by fusing the two polyethylene coating layers around the periphery of the calibration fluid reservoir 110, the channel 150 and the valve hole 112. At this stage, the now foil clad calibration fluid pack 512 is substantially sealed, except for the fill and vent holes 180, 182. Calibration fluid is introduced into the calibration fluid pack 512, in the volume defined by the calibration fluid reservoir 110 and the channel 150, through the fill hole 180. Air is expelled from the calibration fluid pack 512 through the vent hole 182. Once the calibration fluid pack 512 is filled, the fill and vent holes 180, 182 are then sealed in a secondary heat seal process, thus sealing the calibration fluid between the two metal foil elements.

The top surface 102 of the substrate 100 is substantially sealed by the top cover layer 506, with the exception of a hole 522 that corresponds to the location of the sample input port 106 and a hole 536 that corresponds to the location of the optical sensing region 176. The hole 522 allows a sample delivery device, such as a syringe or capillary tube, containing sample fluid to be coupled to the sample input port 106. The bottom surface 104 of the substrate 100 is substantially sealed by the bottom cover layer 508, with the exception that the sensor array 510, optical sensing region 176, and the via 124 are not sealed by the bottom cover layer. The bottom cover layer 508 includes cuts or scoring 524, 526. The scoring 524, 526 could be provided to render the bottom cover layer 508 more malleable and workable in the area proximate the scoring. The position of the scoring 524 corresponds to the position of the valve 514. The scoring 524 could make the portion of the bottom cover layer 508 that is adjacent to the valve 514 more flexible, and could therefore permit the valve to be manipulated more easily. The position of the scoring 526 corresponds to the position of the calibration fluid reservoir 110. The scoring 526 could make the portion of the bottom cover layer 508 adjacent to the calibration fluid reservoir 110 more flexible, and therefore permit the calibration fluid pack 512 to be manipulated more easily. The bottom cover layer 508 also includes pump holes 528, 530. The location of the pump holes 528, 530 corresponds to the location of the pump connection ports 122, 123. The pump connection ports 122, 123 could be connected to a pump in a card reader module through the pump holes 528, 530. To form a seal between the pump and the pump connection ports 122, 123, respective rubber gaskets (not shown) could be positioned over the pump holes 528, 530 such that the holes are inside the openings of the rubber gaskets. The rubber gaskets could be sized and shaped to seal the pump and the pump holes 528, 530. The bottom cover layer further includes a hole 532 overlapping the optical sensing region 176. A 1D barcode 534 is printed on the bottom cover layer 508. The barcode 534 could be read by a card reader module when the fluidic device is inserted into the card reader module. The barcode 534 could authenticate the fluidic device 500 and/or provide information regarding the fluidic device. For example, the barcode 534 could indicate the expiry date, lot number, card serial number and/or card type for the fluidic device 500. The barcode 534 is one example of a machine-readable code that could be printed on the bottom cover layer 508. Other examples of machine-readable codes include 2D barcodes. Radio-frequency identification (RFID) chips or tags could also or instead be used.

In some embodiments, the fluidic device 500 could be operated as follows. First, the fluidic device 500 could be inserted into a corresponding slot of a card reader module. The card reader module might scan the barcode 534 to authenticate the fluidic device 500. The card reader module could also use an actuator to push electrical connectors and/or a heater into contact with the epoxy foil element 516. The actuator could also or instead push rubber gaskets against the bottom cover layer 508 and over the pump holes 528, 530 to couple a pumping system in the card reader module to the pump connection ports 122, 123. Second, the calibration fluid that is stored in the calibration fluid pack 512 could be propelled or pumped into the sensing region 118. This step could include the card reader module using a first actuator element to manipulate the valve 514 by pushing on the bottom cover layer 508 in an area proximate the scoring 524. The manipulation of the valve 514 could cause the rupture plug in the valve to rupture or break the first metal foil element, which opens the valve. At least a portion of the calibration fluid could then be pushed or pumped out of the calibration fluid pack 512, through the channel 150, the valve 112, the channel 152, the via 130, the channel 154, the bubble trap 116, the channel 156, the via 132, the channel 148, and into the sensing region 118. Pushing the calibration fluid out of the calibration fluid pack 512 could be performed by compressing the bottom cover layer 508 in the area proximate the scoring 526 using a second actuator element, such as a plunger, in the card reader module. When the calibration fluid is in the sensing region 118, it might be in contact with one or more of the sensors 520. The card reader module could include circuitry to contact the electrodes 518, which return measurements of the calibration fluid from the sensors 520. These measurements could be used to calibrate the sensors 520 of the fluidic device 500, and thereby compensate for variations between different fluidic devices. The first and second actuator elements could be controlled by a motor-driven system in the card reader module. The card reader module could also include a form of temperature control, such as a heater in contact with the sensor array 510, to adjust the temperature of a fluid in the sensing region 118. This temperature control could help provide consistency in the measurements made by the sensors 520. In some implementations, the temperature of the fluid in the sensing region 118 could be maintained at approximately body temperature.

After calibration, the card reader module could instruct a user to inject a blood sample into the sample fluid input port 106. At least a portion of the blood sample could flow through the channel 138, the via 126, the channel 140 and into the sample fluid storage reservoir 108. A vacuum pump in the card reader module could be coupled to the pump connection port 122 through the pump hole 528. When this vacuum pump is turned on, the vacuum pump could draw the calibration fluid from the sensing region 118 into the waste fluid reservoir 120. Further, the vacuum pump could draw the blood sample from the sample fluid reservoir 108 and/or the channel 140, through the via 128, the channel 144, the bubble trap 114, the channel 146, the via 134, the channel 148, and into the sensing region 118. The card reader module and sensors 520 could then perform measurements on the blood sample to determine the concentration of certain analytes in the blood sample, for example.

In some embodiments, subsequent measurements could also be performed on the blood sample in the fluidic device 500. For example, a vacuum pump in the card reader module that is coupled to the pump connection port 123 through the pump hole 530 could be used to apply vacuum pressure to the pump connection port 123 to draw a portion of the blood sample from the sample fluid reservoir 108 and/or the channel 140, through the channel 142, and into the optical sensing region 176. In some embodiments, pre-treatments (for example, hemolysis) are performed on the blood before the blood reaches the optical sensing region 176. A light source and detector in the card reader module could then perform measurements on the blood sample in the optical sensing region 176 through the holes 532, 536. This could complete the testing that is performed using the fluidic device 500. The fluidic device 500 could be a disposable diagnostic device that is disposed of after use. However, reusable devices are also contemplated.

As noted above, the presence of entrained air bubbles in a fluid that flows in a fluidic device could be detrimental to the performance of the fluidic device. In the example of the fluidic device 500 illustrated in FIGS. 5 and 6, air bubbles could be present in the sample fluid and/or the calibration fluid. In some cases, the sample fluid could be injected into the fluidic device 500 with entrained air bubbles already present. Similarly, the calibration fluid could be added to the calibration fluid pack 512 with entrained air bubbles present. Air bubbles could also or instead be formed as the sample fluid and/or calibration fluid flows through one or more components of the fluidic device 500, for example. Further, air bubbles could form in the calibration fluid while it is stored in the calibration fluid pack 512, even if the calibration fluid was free of bubbles when added to the calibration fluid pack. For example, air bubbles could form if the fluidic device 500 is dropped or shaken. If air bubbles in the sample fluid and/or calibration fluid propagate to the sensing region 118, these air bubbles could become lodged over one or more of the sensors 520 and thus impede the proper response of these sensors. This could reduce the reliability and repeatability of the measurements taken by the fluidic device 500, and possibly render that fluidic device unusable. A card reader module might be able to detect when an air bubble has compromised a measurement, and instruct a user to repeat the measurement using a new fluidic device. However, this process might use additional fluidic devices and larger volumes of sample fluid, and thus reduce efficiency and/or increase operational costs. Accordingly, the fluidic device 500 includes the bubble trap 114 to inhibit the propagation of entrained bubbles in the sample fluid, and the bubble trap 116 to inhibit the propagation of entrained bubbles in the calibration fluid. The bubble traps 114, 116 could help prevent air bubbles entrained in the sample fluid and/or calibration fluid from reaching the sensors 520. The structure and operation of the bubble trap 116 is discussed in detail below. The structure and operation of the bubble trap 114 could be similar to that of the bubble trap 116.

Figure 7:
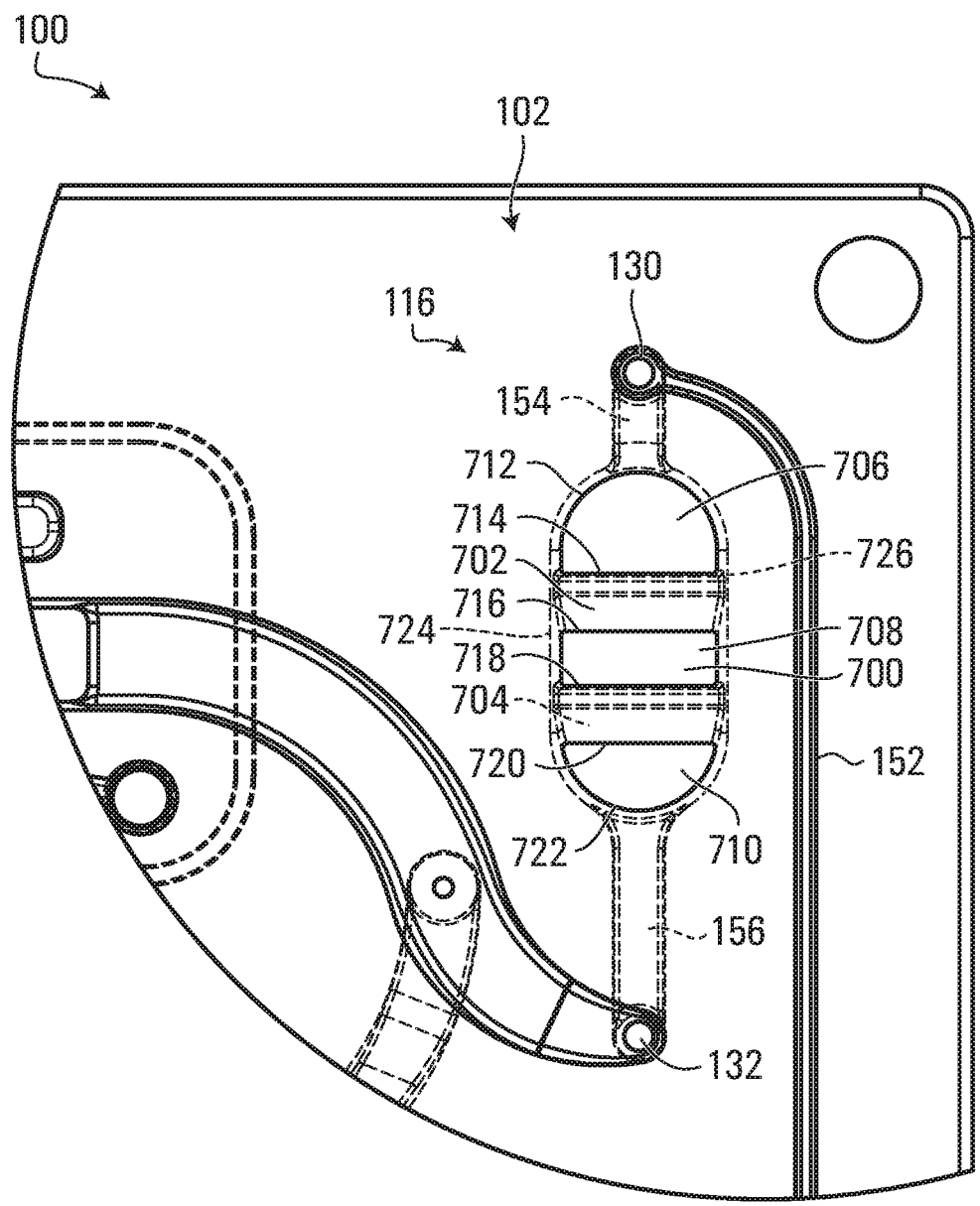
FIG. 7 is a plan view of the top of a bubble trap in the substrate of FIG. 1.
Figure 8:
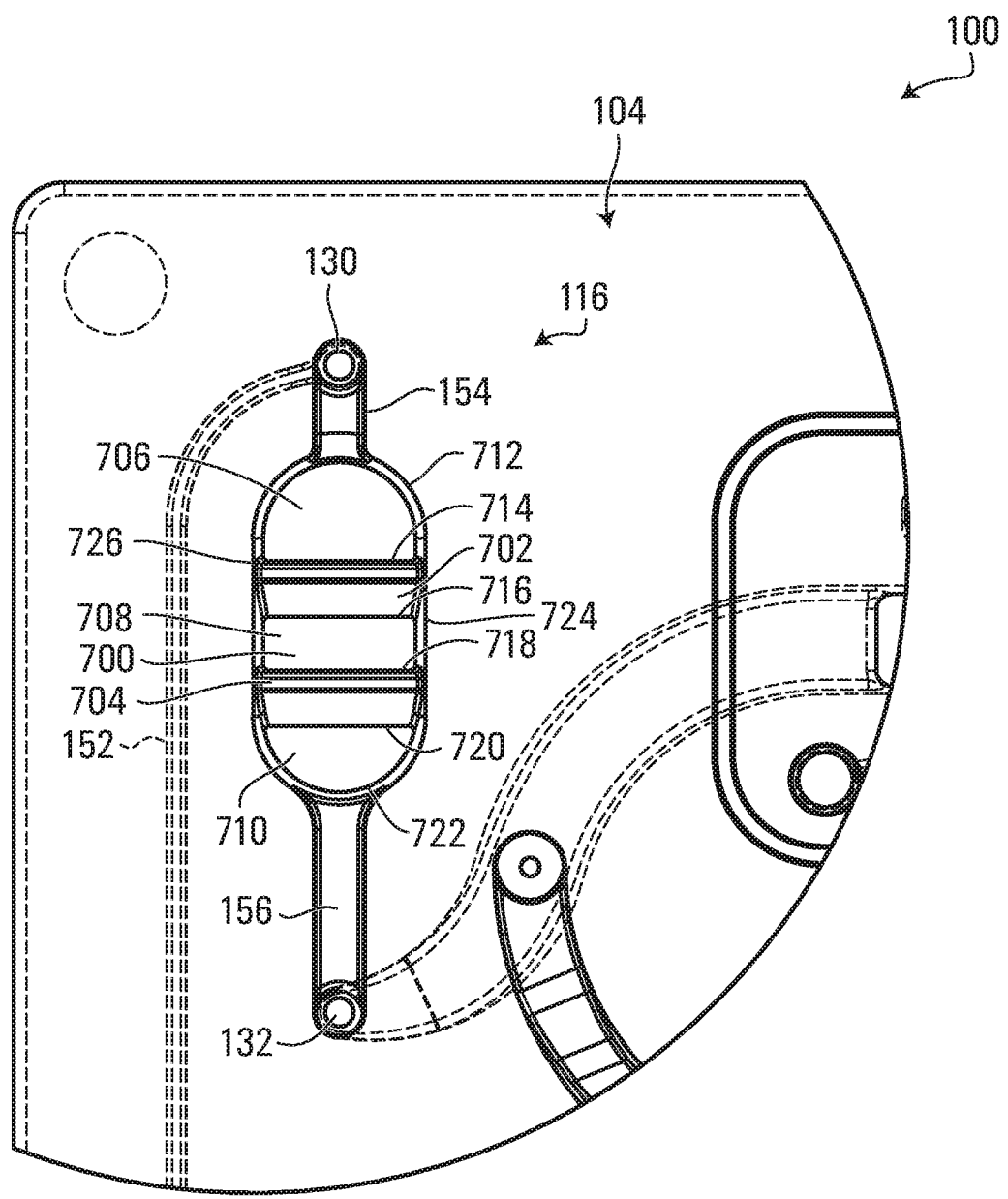
FIG. 8 is a plan view of the bottom of the bubble trap of FIG. 7.
Figure 9:
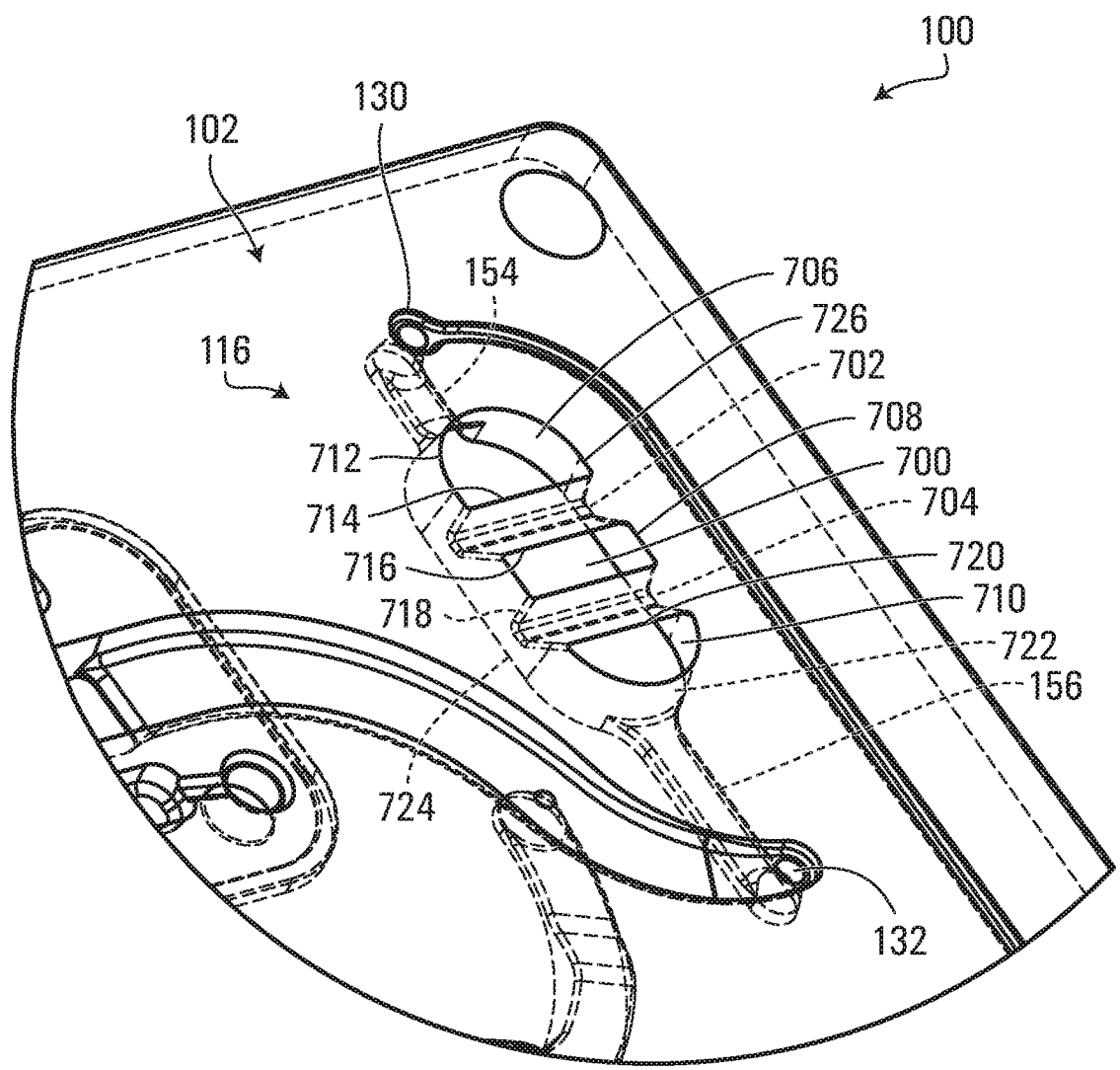
FIG. 9 is a isometric view of the top of the bubble trap of FIG. 7.
Figure 10:
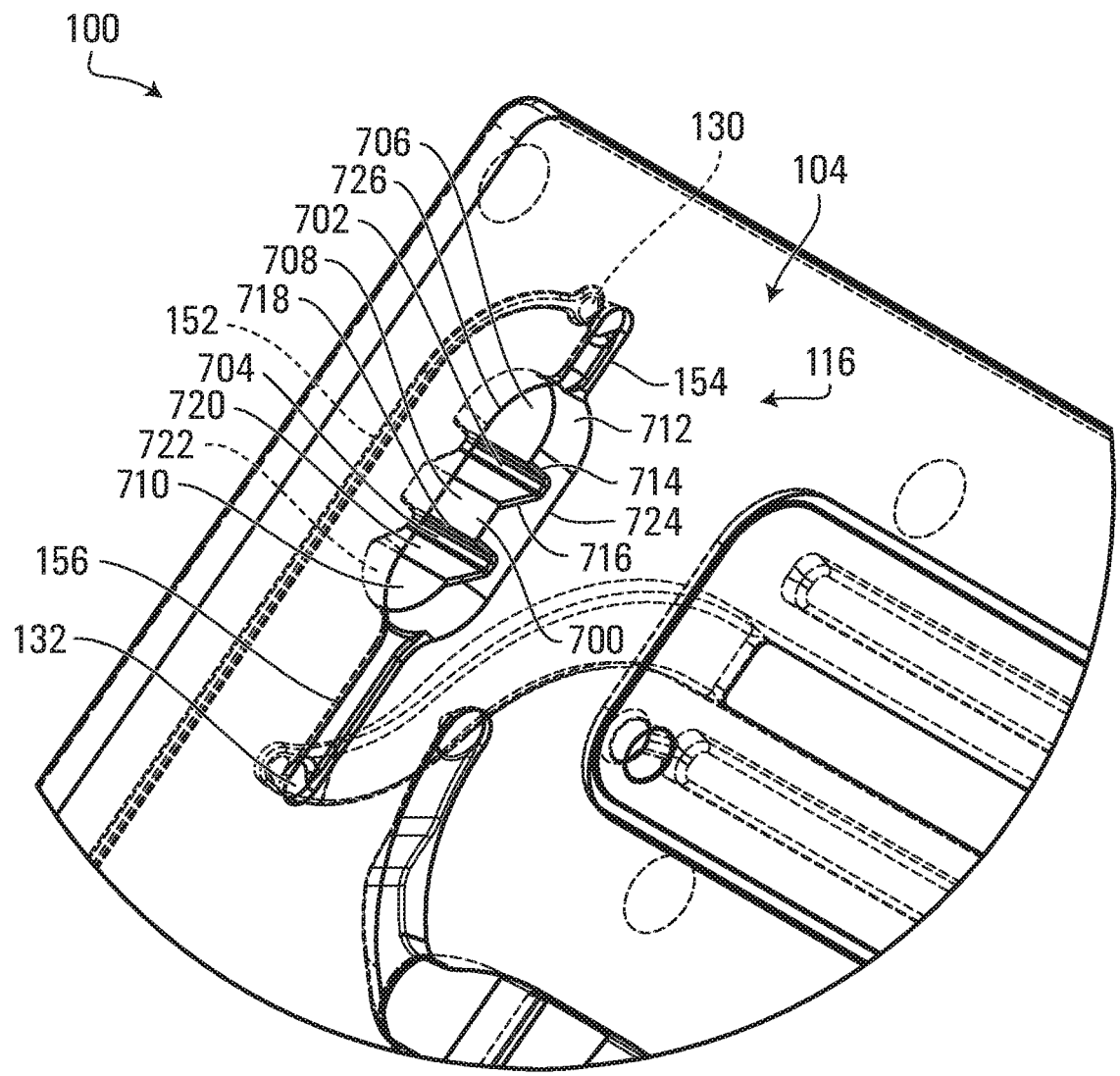
FIG. 10 is a isometric view of the bottom of the bubble trap of FIG. 7.
Figure 11:
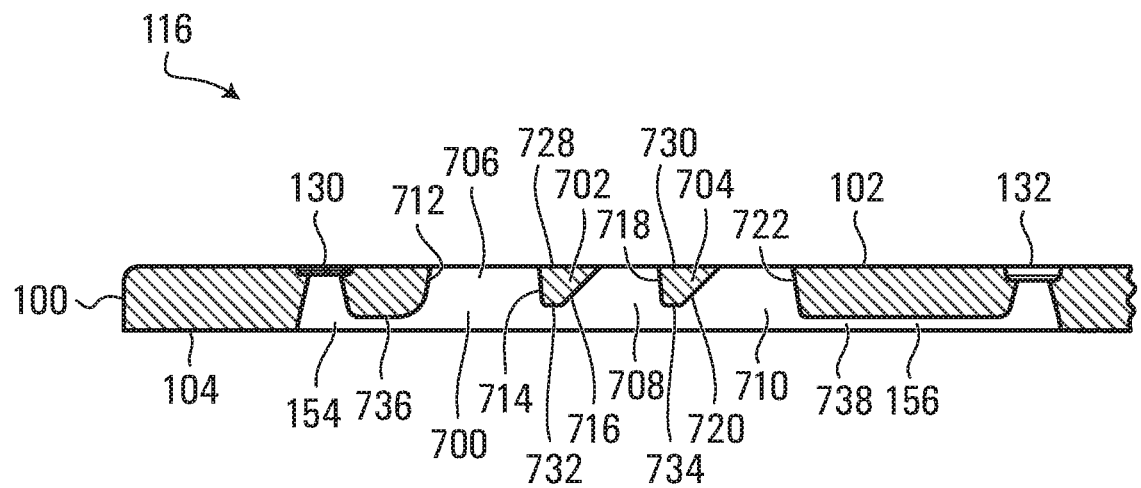
FIG. 11 is a cross-sectional view of the bubble trap of FIG. 7, taken along the line illustrated in FIG. 3.

FIGS. 7 to 11 are magnified views of the bubble trap 116 in the substrate 100. FIG. 7 is a plan view of the bubble trap 116 from the top, FIG. 8 is a plan view of the bubble trap from the bottom, FIG. 9 is an isometric view of the bubble trap from the top, FIG. 10 is an isometric view of the bubble trap from the bottom, and FIG. 11 is a cross-sectional view of the bubble trap taken along the line illustrated in FIG. 3. As shown in FIGS. 7 to 11, the bubble trap 116 includes a chamber 700, multiple transverse beams 702, 704, and multiple bubble trapping sections 706, 708, 710. The chamber 700, traverse beams 702, 704 and bubble trapping sections 706, 708, 710 are formed in the substrate 100.

The chamber 700 is bounded by multiple interior walls or surfaces 712, 722, 724, 726. The surface 712 forms the upstream end of the chamber 700, the surface 722 forms the downstream end of the chamber, and the surfaces 724, 726 form the sides of the chamber 700. The chamber 700 could also be considered to have a top and a bottom. The height of the chamber 700 is measured as the distance from the top of the chamber to the bottom of the chamber. The top of the chamber 700 could be the portion of the chamber that is vertically closest to the top surface 102 of the substrate 100. Similarly, the bottom of the chamber 700 could be the portion of the chamber that is vertically closest to the bottom surface 104 of the substrate 100. In this example, the substrate 100 does not include a wall or surface at the top or the bottom of the chamber 700. Thus, in this example, the chamber 700 extends through the thickness of the substrate 100, from the top surface 102 to the bottom surface 104. The top of the chamber 700 is therefore considered to be in the same plane as the top surface 102 of the substrate 100, and the bottom of the chamber is considered to be in the same plane as the bottom surface 104 of the substrate. The chamber 700 is open at the top surface 102 and the bottom surface 104 in FIGS. 7 to 11. In other embodiments, a chamber of a bubble trap might not extend through the thickness of a substrate. For example, a chamber for a bubble trap could extend through only a portion of the thickness of a substrate, from either the top surface or the bottom surface. In these embodiments, the top of the chamber or the bottom of the chamber might not be in the same plane as the top or bottom surfaces of the substrate.

The chamber 700 is coupled to the channels 154, 156. The channel 154 is coupled to the chamber 700 through a port or opening in the surface 712 and the channel 156 is coupled to the chamber through a port or opening in the surface 722. The channels 154, 156 are relatively shallow compared to the chamber 700. The top of the channels 154, 156 are defined by respective walls of surfaces 736, 738, which are shown in FIG. 11. The bottoms of the channels 154, 156 are defined by the bottom surface 104 of the substrate 100. As such, the channels 154, 156 are coupled to the chamber 700 at a position proximate the bottom of the chamber. However, either or both of the channels 154, 156 could instead be coupled to the chamber 700 at other positions, such as proximate the top of the chamber or between the top and bottom of the chamber. The cross-sectional area of the chamber 700 is greater than the cross-sectional areas of the channels 154, 156, but this might not be the case in all embodiments. For example, any or all of the channels coupled to a chamber of a bubble trap could have cross-sectional areas that are substantially equal to or greater than the cross-sectional area of the chamber.

Each of the transverse beams 702, 704 is adjacent to the top of the chamber 700 and extends substantially perpendicular to a direction of flow for the calibration fluid. The beams 702, 704 act as baffles or ribs that are provided to trap bubbles inside of the chamber 700. As shown in FIG. 11, the beam 702 includes a top surface 728 and a bottom surface 732. Similarly, the beam 704 includes a top surface 730 and a bottom surface 734. The top surfaces 728, 730 are substantially co-planar with the top of the chamber 700 and the top surface 102 of the substrate 100. The beams 702, 704 also include respective upstream walls or surfaces 714, 718, which are substantially perpendicular to the top of the chamber 700 and to the top surfaces 728, 730. The beams 702, 704 further include respective downstream walls or surfaces 716, 720 that are sloped or inclined relative to the top of the chamber 700. The downstream surfaces 716, 720 form acute angles with the top surfaces 728, 730 of the beams 702, 704. The height of the chamber is greater than the height of each of the beams 702, 704, where the height of each beam is measured as the distance between the top surface 728, 730 and the bottom surface 732, 734 of each beam. The height of the beams 702, 704 could also be measured as the distance that each beam extends from the top of the chamber 700 towards the bottom of the chamber. There is a gap between the bottom surfaces 732, 734 of the beams 702, 704 and the bottom of the chamber 700 to allow fluid to flow underneath the beams and reach the channel 156.

The bubble trapping sections 706, 708, 710 are distinct volumes of the chamber 700 that could confine and/or partially enclose any or all bubbles that enter the chamber 700. The width of the bubble trapping sections 706, 708, 710 is substantially similar to the width of the chamber 700. The top of the chamber 700, which in this case corresponds to the top surface 102 of the substrate 100, defines the top boundary of the bubble trapping sections 706, 708, 710. The surface 712 defines the upstream boundary of the bubble trapping section 706, the surface 716 defines the upstream boundary of the bubble trapping section 708, and the surface 720 defines the upstream boundary of the bubble trapping section 710. The surface 714 defines the downstream boundary of the bubble trapping section 706, the surface 718 defines the downstream boundary of the bubble trapping section 708, and the surface 722 defines the downstream boundary of the bubble trapping section 710. Each of the surfaces 714, 718, 722 is adjacent and perpendicular to the top of the chamber 700. However, any or all of the surfaces 714, 718, 722 could instead be inclined to form an acute angle with the top of the chamber 700. The height of each of the surfaces 714, 718, 722 could be at least one half the height of the chamber 700, where the height of the surfaces are measured as the distance each surface extends from the top of the chamber towards the bottom of the chamber. The bottom boundary of each of the bubble trapping sections 706, 708, 710 could be defined by the distance that their respective downstream boundaries extend from the top of the chamber 700 towards the bottom of the chamber. For example, the bottom boundary of the bubble trapping section 706 could be defined by the plane of the surface 732, the bottom boundary of the bubble trapping section 708 could be defined by the plane of the surface 734, and the bottom boundary of the bubble trapping section 710 could be defined by the plane of the surface 738.

Figure 12:
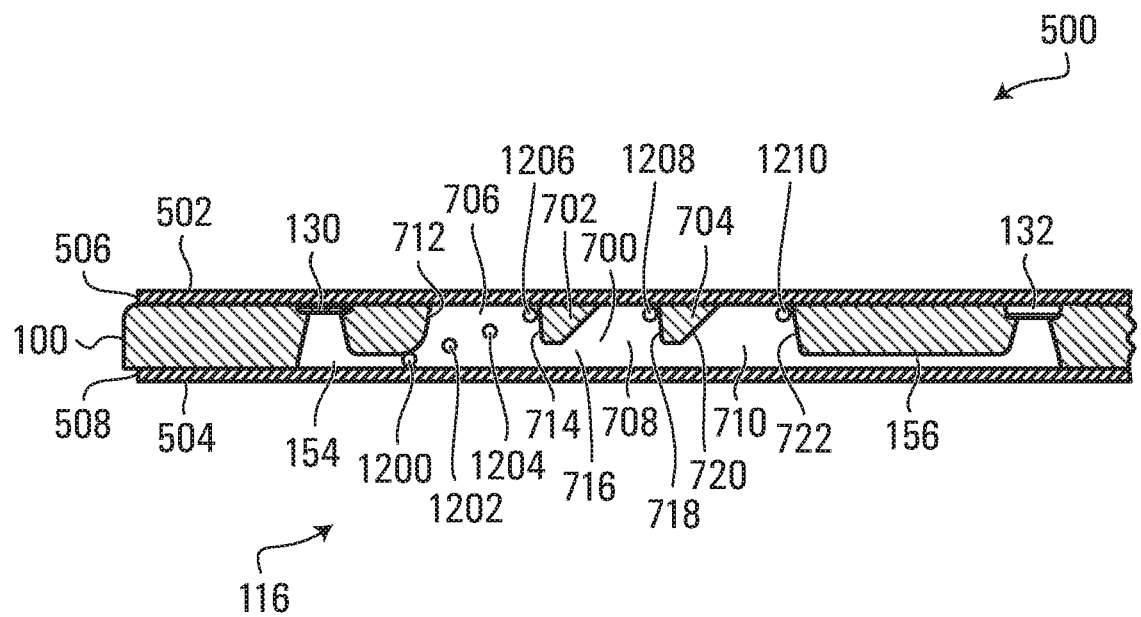
FIG. 12 is a cross-sectional view of a bubble trap in the fluidic device of FIG. 5, taken along the line illustrated in FIG. 5.

Referring now to FIG. 12, shown is a cross-sectional view of the bubble trap 116 in the fluidic device 500, taken along the line illustrated in FIG. 5. FIG. 12 is similar to FIG. 11, with addition of the top cover layer 506 and the bottom cover layer 508. The top cover layer 506 is coupled to the top surface 102 of the substrate 100 and seals or closes the top of the chamber 700. Similarly, the bottom cover layer 508 is coupled to the bottom surface 104 of the substrate 100 and seals or closes the bottom of the chamber 700.

In use, calibration fluid enters the bubble trap 116 through the channel 154, which is in fluid communication downstream of the calibration fluid pack 512. FIG. 12 illustrates multiple air bubbles 1200, 1202, 1204, 1206, 1208, 1210 in the calibration fluid. The air bubble 1200 is an example of an air bubble that is entering the chamber 700 from the channel 154. When air bubbles enter the chamber 700, they could begin to rise upwards due to their buoyancy. In FIG. 12, the fluidic device 500 is oriented with the top surface 502 facing vertical upwards and the bottom surface 504 facing vertically downwards. Therefore, air bubbles will rise towards the top of the chamber 700 in FIG. 12. This is illustrated by the air bubbles 1202, 1204, which are rising through the calibration fluid towards the top of the chamber 700 as the calibration fluid flows through the chamber. The air bubbles 1206, 1208, 1210 are examples of air bubbles that have risen to the top of the chamber 700. The air bubble 1206 is in the bubble trapping section 706, the air bubble 1208 is in the bubble trapping section 708 and the air bubble 1210 is in the bubble trapping section 710.

The surfaces 714, 718, 722 are barriers that are configured to inhibit or prevent bubbles in the calibration fluid from entering the channel 156. The surfaces 714, 718 are part of the beams 702, 704, and therefore these beams could also be considered barriers that inhibit or prevent bubbles in the calibration fluid from entering the channel 156. Advantageously, these barriers in the bubble trap 116 could inhibit bubbles in the calibration fluid from flowing to the sensing region 118, which is in fluid communication downstream of the channel 156.

When air bubbles enter the chamber 700 and rise towards the top of the chamber, the pressure exerted by the flow of fluid through the chamber could cause the air bubbles to collide with the surfaces 714, 718, 722. Because each of the surfaces 714, 718, 722 is substantially perpendicular to the direction of fluid flow, these surfaces could inhibit further movement of the air bubbles. The buoyancy of the air bubbles and/or the force of the fluid flowing through the chamber 700 could trap the air bubbles between the surfaces 714, 718, 722 and the top of the chamber. For example, the air bubble 1206 has collided with the surface 714 and is confined to the bubble trapping section 706, the air bubble 1208 has collided with the surface 718 and is confined to the bubble trapping section 708, and the air bubble 1210 has collided with the surface 722 and is confined to the bubble trapping section 710. The calibration fluid that flows out of the calibration fluid trap 116 and to the sensors 520 could be substantially free of air bubbles.

The particular bubble trapping section that a bubble will become trapped in could depend on any of a variety of factors. One possible factor is the size of the air bubble. Smaller air bubbles have less buoyancy, and therefore they could flow further down the chamber 700 before rising far enough to be confined in one of the bubble trapping sections 706, 708, 710. As such, the bubble trapping sections 708, 710 could trap more small bubbles than the bubble trapping section 706. However, this might not always be the case. For example, smaller bubbles could experience less drag from the fluid flowing through the chamber 700, and therefore they might move through the chamber more slowly, offsetting some effects of their reduced buoyancy. Another possible factor that could influence where a bubble becomes trapped is the total number of air bubbles present in the chamber 700. If the volume of the bubble trapping section 706 is substantially filled with air bubbles, then any additional bubbles entering the chamber 700 could overflow into the bubble trapping sections 708, 710. In some cases, it is possible that bubbles trapped in the bubble trapping section 706 will escape if the fluidic device 500 is agitated, for example. However, these bubbles could still be trapped in the bubble trapping sections 708, 710 before they reach the channel 156. In this sense, the bubble trapping sections 708, 710 could act as a back-up for the bubble trapping section 706.

The geometry of the bubble trap 116 could help reduce the formation of any bubbles in the calibration fluid as it flows through the bubble trap. For example, the inclined surfaces 716, 720 could promote laminar flow and help reduce the mixing of air and calibration fluid in the chamber 700, which might create air bubbles.

One or more characteristics of a bubble trap could be designed, adjusted and/or configured based on the expected properties of a fluid that will flow through the bubble trap. For example, the geometry of a bubble trap could be configured based on the expected number (or density) of bubbles in the fluid that flows through the bubble trap, the expected size (or range of sizes) of these bubbles, and/or the expected viscosity of the fluid.

The expected number and size of bubbles in the calibration fluid flowing through the bubble trap 116 could be taken into consideration when determining the volume of any or all of the bubble trapping sections 706, 708, 710. In the case that a relatively high number of bubbles are present in the fluid, and/or the average size of these bubbles is relatively large, it is possible that the bubbles could fill up the bubble trapping sections 706, 708, 710. Beyond a certain total volume of air bubbles, the bubble trapping sections 706, 708, 710 might not have enough room to contain further air bubbles that enter the chamber 700. This could cause air bubbles to overflow into the channel 156, and thus reduce the effectiveness of the bubble trap 116. This situation could be referred to as an overfill failure. To help mitigate or prevent an overfill failure, the total volume of the bubble trapping sections 706, 708, 710 could be designed to contain at least the expected total volume of air bubbles. The chamber 700 extends from the top surface 102 to the bottom surface 104 of the substrate 100, and therefore the chamber 700 utilizes the entire thickness of the substrate. This could provide an increased volume available in the bubble trapping sections 706, 708, 710 compared to a bubble trapping chamber that does not extend through the full thickness of a substrate. To further increase the volume available in the bubble trapping sections 706, 708, 710, the thickness of the substrate 100 could be increased, along with the height of the chamber 700. Another possible way to increase the volume of the bubble trapping sections 706, 708, 710 is to increase the length of the chamber 700 by increasing the distance between the end surfaces 712, 722. Yet another possible way to increase the volume of the bubble trapping sections 706, 708, 710 is to increase the width of the chamber 700 by increasing the distance between the side surfaces 724, 726. A further possible way to increase the volume of the bubble trapping sections 706, 708, 710 is to decrease the width of the beams 702, 704, by decreasing the length of the surfaces 728, 730 and/or the surfaces 732, 734, for example. Yet another possible way to increase the volume of the bubble trapping sections 706, 708, 710 is to increase the length of the surfaces 714, 718, 722, while leaving enough room for fluid to flow under the barriers 702, 704 and into the channel 156. In some embodiments, the volume available in bubble trapping sections of a bubble trap could be effectively increased using an air permeable membrane. In FIG. 12, for example, the top cover layer 506 could be replaced with an air permeable membrane that allows the air bubbles that rise to the top of the chamber 700 to diffuse through the membrane and out of the chamber 700. This could liberate some volume in the bubble trapping sections 706, 708, 710, and thus allow these bubble trapping sections to trap additional air bubbles. Air permeable membranes could be particularly advantageous for use with bubble traps in fluidic devices that are non-disposable and/or are repeatedly or continuously used.

The expected viscosity of a fluid flowing through a bubble trap and/or the expected size of entrained air bubbles in that fluid could be taken into account when determining the rate of flow for the fluid in the bubble trap. A higher fluid viscosity could decrease the rate at which bubbles rise towards the top of a bubble trap. Accordingly, air bubbles might take a longer time to rise in more viscous fluids. This could be particularly true for relatively small air bubbles, which might have less buoyancy than larger air bubbles and rise at a slower rate. If the flow rate in a bubble trap is too high compared to the time it takes bubbles to rise towards the top of the bubble trap, it is possible that air bubbles could reach the end of the bubble trap before having risen far enough to be blocked by a barrier, and therefore the bubbles could escape the bubble trap. This situation could be referred to as a high flow speed failure. To help prevent or mitigate a high flow speed failure, the flow rate of a fluid in a bubble trap could be determined and/or controlled such that the bubbles have enough time to rise and be blocked by a barrier. In the example of the bubble trap 116 illustrated in FIG. 12, this could be done in any of a variety of different ways. One possible way to help ensure that air bubbles are trapped in the chamber 700 is to increase the cross-section of the chamber in order to decrease the flow rate through the chamber. Another possible way to help ensure that air bubbles are trapped in the chamber 700 is to control or limit the rate at which the calibration fluid is pumped from the calibration fluid pack 512 to control the flow speed in the chamber. Limiting the rate at which the calibration fluid is pumped from the calibration fluid pack 512 could be controlled by a card reader module, for example. Yet another possible way to help ensure that air bubbles are trapped in the chamber 700 is to ensure that the barriers provided by the surfaces 714, 718, 722 extend far enough towards the bottom of the chamber such that air bubbles would be expected to rise far enough to be blocked. A further possible way to help ensure that air bubbles are trapped in the chamber 700 is to increase the length of the chamber, which could increase the time that the bubbles have to rise towards the top of the chamber.

As noted above, the bubble trap 114 could be similar in operation and structure to the bubble trap 116. However, the bubble trap 114 will trap bubbles in sample fluid, which in this example could be a whole blood sample, while the fluid trap 116 traps bubbles in calibration fluid. In some implementations, the viscosity of a sample fluid, such as blood, could be higher than the viscosity of calibration fluid. Therefore, the bubble trap 114 could be designed, adjusted and/or configured, as outlined above, to account for the higher viscosity of blood and effectively trap bubbles.

Figure 13:
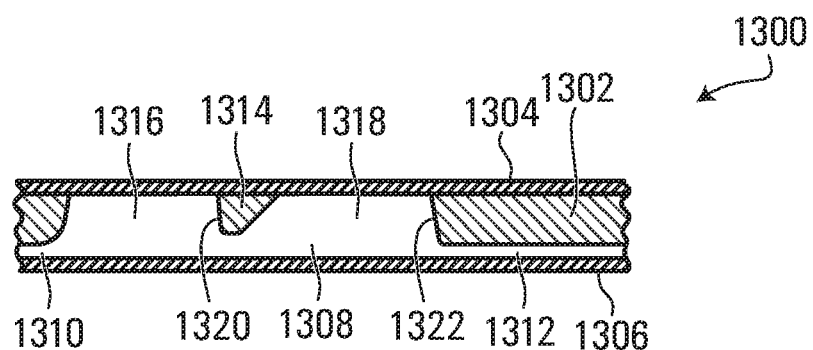
FIG. 13 is a cross-sectional view of a bubble trap in another example fluidic device.

The structure of the bubble traps 114, 116 are provided by way of example. Other bubble strap structures could also or instead be used in a fluidic device. For example, a bubble trap could have more than two transverse beams or fewer than two transverse beams. FIG. 13 is a cross-sectional view of another example bubble trap in a fluidic device 1300. The fluidic device 1300 could be a microfluidic device. The fluidic device 1300 includes a substrate 1302, a top cover layer 1304 and a bottom cover layer 1306. The substrate 1302 includes a chamber 1308 coupled to an input channel 1310 and an output channel 1312. The chamber 1308 includes a single transverse beam 1314, and two bubble trapping sections 1316, 1318. A wall or surface 1320 on the beam 1314 forms the downstream boundary of the bubble trapping section 1316, and a wall or surface 1322 of the chamber 1308 forms the downstream boundary of the bubble trapping section 1318. Any or all of the surfaces 1320, 1322 and the beam 1314 could be considered barriers that inhibit bubbles in a fluid flowing through the chamber 1308 from entering the channel 1312. When compared to the bubble trap 116 of the fluidic device 500 illustrated in FIG. 12, the bubble trap of the fluidic device 1300 could be considered to have a greater total trapping volume due to the inclusion of one beam rather than two, if all other dimensions of the bubble traps are otherwise equal.

Figure 14:
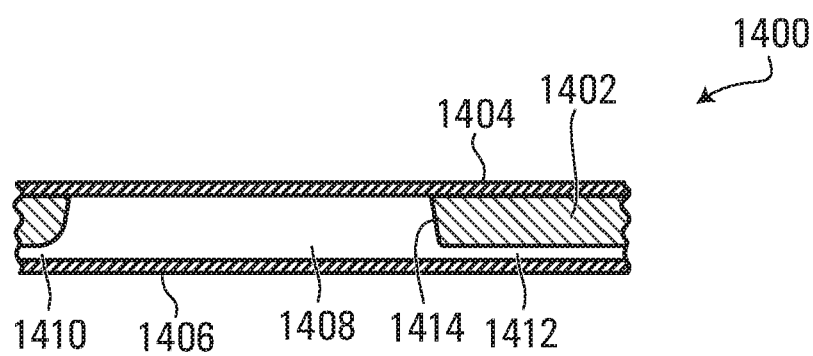
FIG. 14 is a cross-sectional view of a bubble trap in yet another example fluidic device.

FIG. 14 is cross-sectional view of yet another example bubble trap in a fluidic device 1400. The fluidic device 1400 could be a microfluidic device. The fluidic device 1400 includes a substrate 1402, a top cover layer 1404 and a bottom cover layer 1406. The substrate 1402 includes a chamber 1408 coupled to an input channel 1410 and an output channel 1412. The chamber 1408 does not include any transverse beams. Thus, the chamber 1408 could be considered to be a single bubble trapping section. A wall or surface 1414 of the chamber 1408 forms the downstream boundary of the bubble trapping section. The surface 1414 could be considered a single barrier to inhibit bubbles in a fluid that flows through the chamber 1408 from entering the channel 1412.

Figure 15:
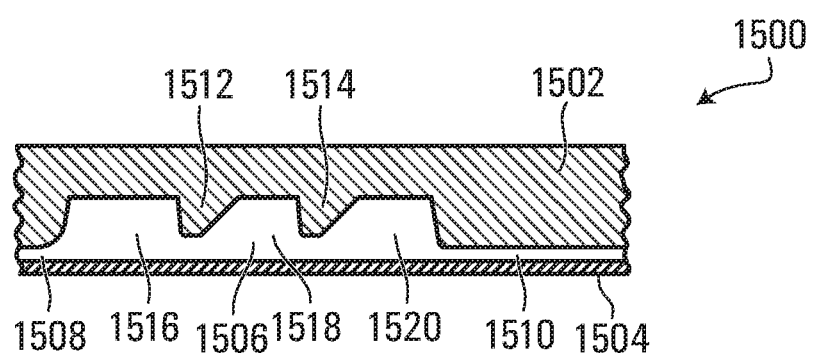
FIG. 15 is a cross-sectional view of a bubble trap in a further example fluidic device.

FIG. 15 is a cross-sectional view of a further example bubble trap in a fluidic device 1500. The fluidic device 1500 could be a microfluidic device. The fluidic device 1500 includes a substrate 1502 and a bottom cover layer 1504. The substrate 1502 includes a chamber 1506 coupled to an input channel 1508 and an output channel 1510. The chamber 1506 includes two transverse beams 1512, 1514 and three bubble trapping sections 1516, 1518, 1520. In contrast to the chamber 700 of FIGS. 7 to 12, for example, the chamber 1506 does not extend through the thickness of the substrate 1502. Rather, the chamber 1506 is formed in the bottom surface of the substrate 1502 and extends only part of the way through the thickness of the substrate. In other embodiments, a chamber could be formed in the top surface of a substrate and extend only part of the way through the thickness of the substrate.

The embodiments described above relate primarily to fluidic devices. Other embodiments, including methods, are also contemplated.

Figure 16:
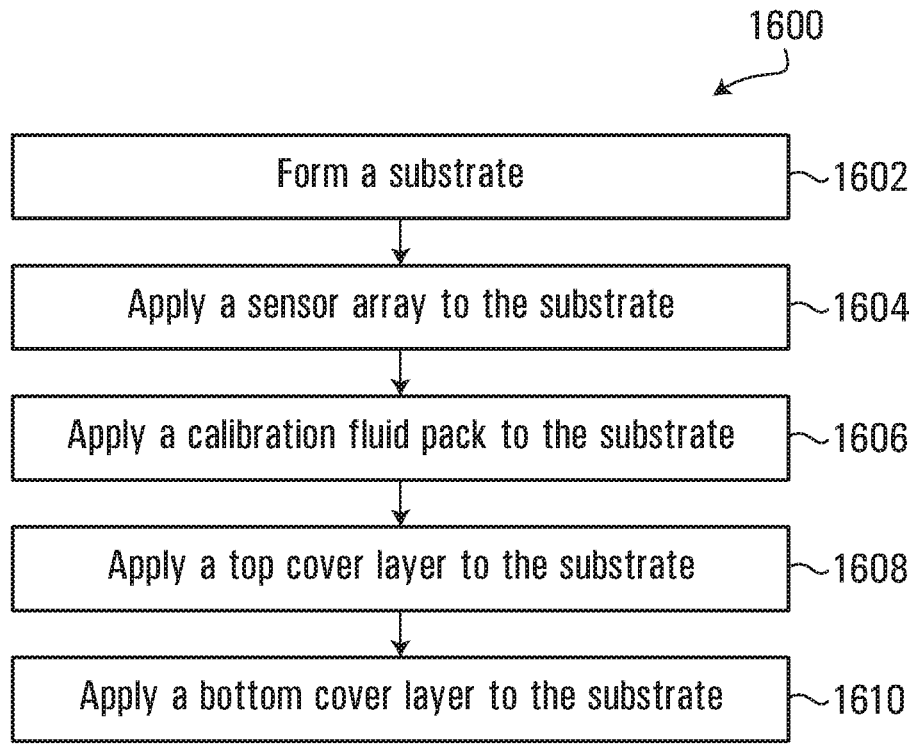
FIG. 16 is a flow diagram illustrating an example method for manufacturing a fluidic device.

FIG. 16, for example, is a flow diagram illustrating an example method 1600 for manufacturing a fluidic device. In some implementations, the fluidic device that is manufactured using the method 1600 could be a microfluidic device. The method 1600 includes multiple steps 1602, 1604, 1606, 1608, 1610.

Step 1602 includes forming a substrate for the fluidic device that comprises a chamber, first and second channels coupled to the chamber, and a plurality of barriers adjacent to a top of the chamber to inhibit bubbles in fluid received from the first channel from entering the second channel. This substrate could be similar to the substrates 100, 1302, 1402 and/or 1502 that are discussed in detail above, for example. The substrate could be formed as a single, unitary body or part. In other words, the substrate might not be fabricated using multiple components that are bonded or otherwise coupled together. Forming the substrate could include molding the substrate. Forming the substrate could also or instead include milling and/or etching the substrate from a blank material. Examples of molding include injection molding, compression molding and thermoforming. A steel mold for the substrate could be used in an injection molding process, for example. Advantageously, injection molding could form the substrate, including the bubble trap structures disclosed herein, relatively quickly and inexpensively. In contrast, if the bubble traps were added to a substrate as a separate part, the bubble traps might incur costs to obtain the part (for example, purchasing bubble traps, inspecting the bubble traps, inventory management and supply chain management), and costs to bond the bubble traps to the substrate (for example, developing a bonding process, purchasing bonding equipment, training bonding operators and maintaining documentation).

Step 1604 is an optional step that includes applying a sensor array to the substrate. This sensor array could be similar to the sensor array 510 of FIG. 6, for example. The sensor array could be applied over a sensing region in the substrate. Applying the sensor array to the substrate could include aligning the sensor array with the sensing region, and then coupling the sensor array to the substrate. Adhesives could be used to couple the sensor array to the substrate.

Step 1606 is an optional step that includes applying a calibration fluid pack to the substrate. The calibration fluid pack could include two metal foil elements that are assembled on the substrate. Step 1606 could also include filling this calibration fluid pack with calibration fluid, and/or assembling a valve to control the flow of calibration fluid from the calibration fluid pack. This calibration fluid pack and valve could be similar to the calibration fluid pack 512 and the valve 514 of FIG. 5, for example. The assembly of the calibration fluid pack 512 and the valve 514 are discussed elsewhere herein.

Steps 1608 and 1610 are optional steps that include applying top and bottom cover layers to the substrate to seal the top and bottom surfaces of the substrate. These top and bottom cover layers could be similar to the top and bottom cover layers 506, 508 of FIGS. 5, 6 and 12, for example. Applying the top and bottom cover layers could include aligning the top and bottom cover layers with appropriate portions of the substrate and bonding the cover layers to the substrate using an adhesive. The top and bottom cover layers could also or instead be bonded to the substrate using a plastic welding process. Advantageously, applying top and/or bottom cover layers on the substrate could close or seal any number of fluidic components in the substrate for a one-time cost. In other words, the cost of sealing fluidic components on the substrate might not increase with the number of components on the substrate. Applying the top cover layer could seal the top of one or more bubble trap chambers in the substrate. Similarly, applying the bottom cover layer could seal the bottom of one or more bubble trap chambers.

The order of steps 1602, 1604, 1606, 1608, 1610 shown in FIG. 16 is only an example. These steps could also be performed in different orders. For example, step 1608 could be performed before step 1604 and/or step 1606.

Figure 17:
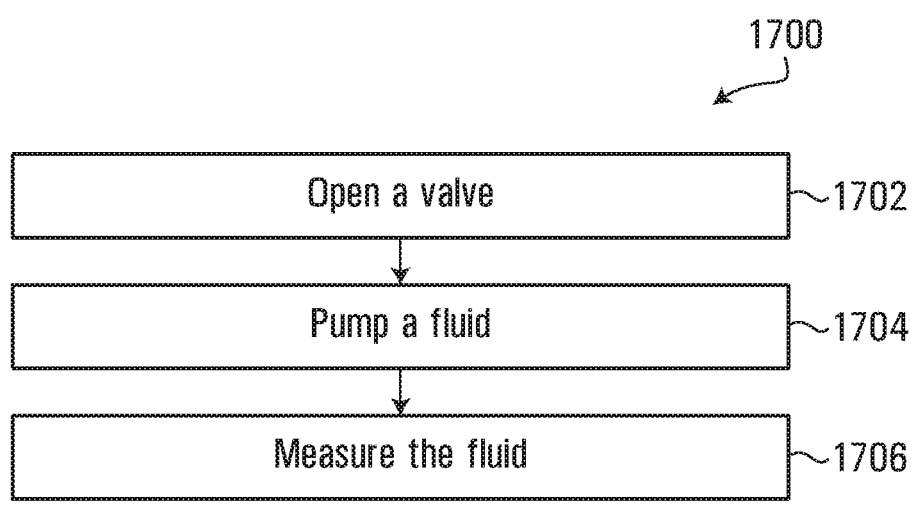
FIG. 17 is a flow diagram illustrating an example method for trapping bubbles entrained in a fluid in a fluidic device.

FIG. 17 is a flow diagram illustrating an example method 1700 for trapping bubbles entrained in a fluid in a fluidic device. This fluidic device could be similar to the fluidic devices 500, 1300, 1400 and/or 1500, for example. The method 1700 includes multiple steps 1702, 1704, 1706.

Step 1702 is an optional step that includes opening a valve in the fluidic device to permit a flow of fluid in the fluidic device. In the example of the fluidic device 500 of FIGS. 5, 6 and 12, step 1702 could include manipulating the valve 514 by pushing on the bottom cover layer 508 in an area proximate the scoring 524, which could cause the valve to open.

Step 1704 includes pumping a fluid through a first channel in the fluidic device, through a chamber in the fluidic device that includes a plurality of barriers adjacent to a top of the chamber, and into a second channel in the fluidic device that receives the fluid from the chamber. The plurality of barriers adjacent to the top of the chamber could inhibit bubbles in the fluid from entering the second channel. Referring again to the example of the fluidic device 500, pumping the fluid could include pumping a calibration fluid out of the calibration fluid pack 512, and/or injecting a sample fluid into the sample fluid input port 106. In some implementations, pumping the fluid through the first channel comprises pumping the fluid through the first channel at a predetermined rate to induce a rate of flow for the fluid in the chamber that permits the bubbles to rise towards the top of the chamber and be trapped by the plurality of barriers.

Step 1706 is an optional step that includes measuring the fluid. Fluid measurements could be performed by one or more sensors, such as the sensors 520 of FIG. 5, for example.

Although the present disclosure relates primarily to fluidic devices for diagnostic systems such as blood analysis systems, the embodiments described herein could also or instead relate to other applications for fluidic devices. In particular, the bubble traps described herein could be used in any of a variety of applications where trapping bubbles entrained in a flow of fluid would be advantageous.

The inventive concepts disclosed herein are not limited in their application to the details of construction and the arrangement of the components set forth in the description or illustrated in the drawings. The inventive concepts disclosed herein are capable of other embodiments or of being practiced or carried out in various ways. Also, it is to be understood that the phraseology and terminology employed herein is for the purpose of description and should not be regarded as limiting the inventive concepts disclosed and claimed herein in any way.

Numerous specific details are set forth in order to provide a more thorough understanding of the inventive concepts. However, it will be apparent to one of ordinary skill in the art that the inventive concepts within the instant disclosure may be practiced without these specific details. In other instances, well-known features have not been described in detail to avoid unnecessarily complicating the instant disclosure.

As used herein, the terms "comprises," "comprising," "includes," "including," "has," "having" or any other variation thereof, are intended to cover a nonexclusive inclusion. For example, a composition, a process, method, article, or apparatus that comprises a list of elements is not necessarily limited to only those elements but may include other elements not expressly listed or inherently present therein.

As used herein the terms "approximately," "about," "substantially" and variations thereof are intended to include not only the exact value qualified by the term, but to also include some slight deviations therefrom, such as deviations caused by measuring error, manufacturing tolerances, wear and tear on components or structures, stress exerted on structures, and combinations thereof, for example.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present). An inclusive or may be understood as being the equivalent to: at least one of condition A or B.

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The invention claimed is:

1. A substrate for a fluidic device, the substrate comprising:
   a first channel to carry a fluid;
   a chamber, coupled to the first channel, to receive the fluid from the first channel, the chamber comprising a top and a bottom;
   a second channel, coupled to the chamber, to receive the fluid from the chamber; and
   a plurality of barriers adjacent to the top of the chamber to inhibit bubbles in the fluid from entering the second channel.

2. The substrate of claim 1, wherein the substrate is a unitary body.

3. The substrate of claim 1, wherein the second channel is coupled to the chamber at a position proximate the bottom of the chamber.

4. The substrate of claim 1, wherein the first channel is coupled to the chamber at a position proximate the bottom of the chamber.

5. The substrate of claim 1, wherein a cross-sectional area of the chamber is greater than a cross-sectional area of the first channel and a cross-sectional area of the second channel, wherein the cross-sectional areas of the chamber, first channel and second channel are measured perpendicular to a direction of flow for the fluid.

6. The substrate of claim 1, wherein the plurality of barriers comprises an interior wall of the chamber.

7. The substrate of claim 1, wherein the plurality of barriers comprises a transverse beam extending substantially perpendicular to a direction of flow for the fluid.

8. The substrate of claim 7, wherein the transverse beam is configured to trap at least one bubble between the top of the chamber and the transverse beam.

9. The substrate of claim 7, wherein an upstream surface of the beam is substantially perpendicular to the top of the chamber and a downstream surface of the beam is inclined relative to the top of the chamber.

10. The substrate of claim 1, wherein the plurality of barriers comprises an interior wall of the chamber and a plurality of transverse beams extending substantially perpendicular to a direction of flow for the fluid.

11. The substrate of claim 1, wherein a height of the chamber is greater than a height of at least one barrier of the plurality of barriers, wherein the height of the chamber is measured as a distance from the top of the chamber to the bottom of the chamber, and the height of the at least one barrier is measured as a distance that the at least one barrier extends from the top of the chamber towards the bottom of the chamber.

12. The substrate of claim 11, wherein the height of the at least one barrier is at least one half of the height of the chamber.

13. A fluidic device comprising:
    the substrate of claim 1;
    a source of the fluid in fluid communication with the first channel, the source of the fluid being upstream of the first channel; and
    a bottom cover layer, coupled to a bottom surface of the substrate, to seal the bottom of the chamber.

14. The fluidic device of claim 13, further comprising a top cover layer, coupled to a top surface of the substrate, to seal the top of the chamber.

15. The fluidic device of claim 14, wherein the top cover layer and the bottom cover layer comprise an adhesive.

16. The fluidic device of claim 13, further comprising a sensor in fluid communication with the second channel, the sensor being downstream of the second channel.

17. A method of manufacturing a fluidic device, the method comprising:
    forming a substrate, the substrate comprising:
        a first channel to carry a fluid;
        a chamber, coupled to the first channel, to receive the fluid from the first channel, the chamber comprising a top and a bottom;
        a second channel, coupled to the chamber, to receive the fluid from the chamber; and
        a plurality of barriers adjacent to the top of the chamber to inhibit bubbles in the fluid from entering the second channel.

18. The method of claim 17, wherein forming the substrate comprises molding the substrate.

19. The method of claim 17, further comprising applying a bottom cover layer to a bottom surface of the substrate to seal the bottom of the chamber.

20. The method of claim 17, further comprising applying a top cover layer to a top surface of the substrate to seal the top of the chamber.

21. A method of trapping bubbles entrained in a fluid in a fluidic device, the method comprising:
    pumping a fluid through a first channel in the fluidic device, through a chamber in the fluidic device that receives the fluid from the first channel, and into a second channel in the fluidic device that receives the fluid from the chamber, wherein a plurality of barriers adjacent to a top of the chamber inhibit bubbles in the fluid from entering the second channel.

22. The method of claim 21, wherein pumping the fluid through the first channel comprises pumping the fluid through the first channel at a predetermined rate to induce a rate of flow for the fluid in the chamber that permits the bubbles to rise towards the top of the chamber and be trapped by the plurality of barriers.

\* \* \* \* \*